(12) United States Patent
Tamagawa

(10) Patent No.: US 9,034,218 B2
(45) Date of Patent: May 19, 2015

(54) CELLULOSE ESTER FILM, METHOD OF MANUFACTURING THE SAME, POLARIZING PLATE AND LIQUID CRYSTAL DISPLAY

(75) Inventor: Minori Tamagawa, Tokyo (JP)

(73) Assignee: KONICA MINOLTA OPTO, INC., Tokyo (JP)

( * ) Notice: Subject to any disclaimer, the term of this patent is extended or adjusted under 35 U.S.C. 154(b) by 663 days.

(21) Appl. No.: 13/351,279

(22) Filed: Jan. 17, 2012

(65) Prior Publication Data

US 2012/0111230 A1    May 10, 2012

Related U.S. Application Data

(62) Division of application No. 12/744,393, filed as application No. PCT/JP2008/068906 on Oct. 18, 2008, now abandoned.

(30) Foreign Application Priority Data

Nov. 29, 2007    (JP) ................................. 2007-308567

(51) Int. Cl.
     *F21V 9/00*       (2006.01)
     *G02B 5/02*       (2006.01)
     (Continued)

(52) U.S. Cl.
     CPC .............. *B29C 41/26* (2013.01); *B29C 55/06* (2013.01); *B29C 55/08* (2013.01); *B29C 55/14* (2013.01); *B29C 55/16* (2013.01); *B29K 2001/00* (2013.01); *B29K 2001/12* (2013.01); *B29K 2995/0034* (2013.01); *C08B 3/16* (2013.01);

(Continued)

(58) Field of Classification Search
     USPC ..................... 106/170.3, 182.1, 186.2, 171.1; 252/582; 264/217, 291; 349/96, 117, 349/122; 359/489.02, 489.07; 428/1.1, 1.3
See application file for complete search history.

(56) References Cited

U.S. PATENT DOCUMENTS

2006/0257591 A1* 11/2006 Takagi et al. .................. 428/1.3
2007/0247576 A1* 10/2007 Tamagawa et al. ............ 349/117

FOREIGN PATENT DOCUMENTS

| JP | 2000336179 | 5/2000 |
|----|------------|--------|
| JP | 2000352620 | 12/2000 |

(Continued)

OTHER PUBLICATIONS

TIPO Office Action, Patent Application 097145502, TIPO date of issue: Aug. 16, 2013 (5 pages).

(Continued)

*Primary Examiner* — Bijan Ahvazi
(74) *Attorney, Agent, or Firm* — Lucas & Mercanti, LLP

(57) ABSTRACT

An object of this invention is to provide a cellulose ester film which satisfies the requirement 0.95<plasticizer content of A surface/plasticizer content of B surface<1.05, provided that A surface represents one surface of the cellulose ester film and B surface represents the other surface, has a high sound velocity of the film and is excellent in light leakage and color unevenness, and a film-forming method of this cellulose ester film. The cellulose ester film of the present invention, which contains a cellulose ester, is characterized by satisfying the requirement 0.95<plasticizer content of A surface/plasticizer content of B surface<1.05, provided that A surface represents one surface of the cellulose ester film and B surface represents the other surface, and having a sound velocity along at least one of a film transport direction and the lateral direction at 23.° C. 55% RH of 2.0-2.7 km/s.

6 Claims, 1 Drawing Sheet

(51) Int. Cl.
| | |
|---|---|
| *G02C 7/10* | (2006.01) |
| *G02F 1/361* | (2006.01) |
| *G03B 11/00* | (2006.01) |
| *B29C 41/26* | (2006.01) |
| *B29C 55/06* | (2006.01) |
| *B29C 55/08* | (2006.01) |
| *B29C 55/14* | (2006.01) |
| *B29C 55/16* | (2006.01) |
| *C08B 3/16* | (2006.01) |
| *C08J 5/18* | (2006.01) |
| *C08K 5/51* | (2006.01) |
| *C08L 1/10* | (2006.01) |
| *C08L 1/14* | (2006.01) |
| *G02B 27/28* | (2006.01) |
| *G02B 5/30* | (2006.01) |
| *B29K 1/00* | (2006.01) |
| *G02F 1/1335* | (2006.01) |

(52) U.S. Cl.
CPC ............... *C08J 5/18* (2013.01); *C08J 2301/14* (2013.01); *C08K 5/51* (2013.01); *C08L 1/10* (2013.01); *C08L 1/14* (2013.01); *G02B 5/3033* (2013.01); *G02F 1/133528* (2013.01)

(56) References Cited

FOREIGN PATENT DOCUMENTS

| | | |
|---|---|---|
| JP | 2002189126 | 7/2002 |
| JP | 2005-017674 | 1/2005 |
| JP | 200517574 | 1/2005 |
| JP | 2005017574 | 1/2005 |
| JP | 2005178194 | 7/2005 |
| JP | 2006030962 | 2/2006 |
| JP | 2006199855 | 8/2006 |
| JP | 2006291186 | 10/2006 |
| JP | 2006306052 | 11/2006 |
| JP | 2007-164017 | 6/2007 |
| JP | 2007154136 | 6/2007 |
| JP | 2007164017 | 6/2007 |
| JP | 2007245539 | 9/2007 |
| JP | 2007256637 | 10/2007 |
| JP | 2007264287 | 10/2007 |
| JP | 20081097 | 1/2008 |
| JP | 200895026 | 4/2008 |
| JP | 2008256744 | 10/2008 |
| WO | 2006/121026 | 11/2006 |
| WO | 2007043358 | 4/2007 |
| WO | 2007/125764 | 11/2007 |

OTHER PUBLICATIONS

English translation of TIPO Office Action, Patent Application 097145502, TIPO date of issue: Aug. 16, 2013 (5 pages).

Korean Office Action, Notice of Invitation of Filing Response, Application No. 10-2010-7011350. Mailing Date: Jul. 26, 2014 (4 pages).

English translation of Korean Office Action, Notice of Invitation of Filing Response, Application No. 10-2010-7011350. Mailing Date: Jul. 26, 2014 (4 pages).

\* cited by examiner

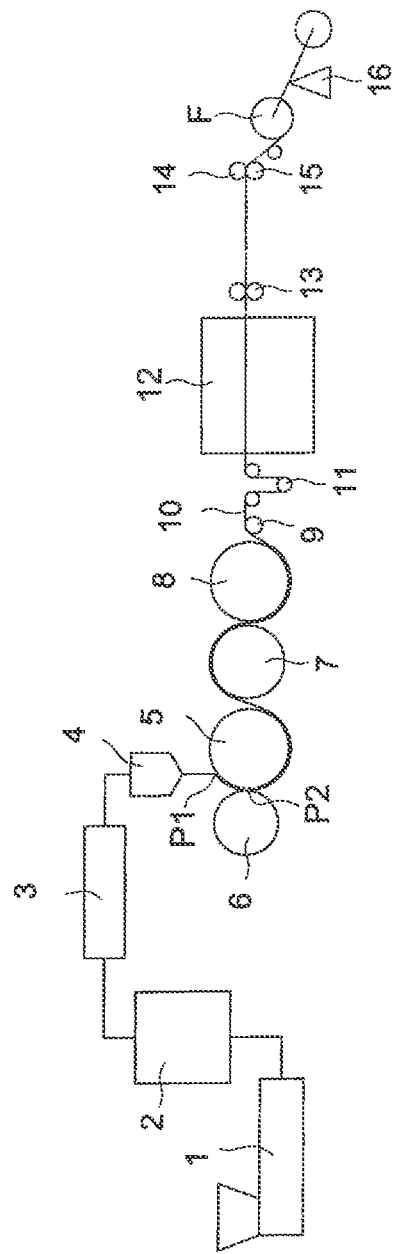

CELLULOSE ESTER FILM, METHOD OF MANUFACTURING THE SAME, POLARIZING PLATE AND LIQUID CRYSTAL DISPLAY

CROSS REFERENCE TO RELATED APPLICATIONS

This is a Divisional of U.S. patent application Ser. No. 12/744,393, filed May 24, 2010, which, in turn, was a U.S. National Phase Application under 35 U.S.C. 371 of International Application PCT/JP2008/068906, filed Oct. 18, 2008, which claims the priority of Japanese Application No. 2007-308567, filed Nov. 29, 2007, the entire content of all three Applications are hereby incorporated by reference.

FIELD OF THE INVENTION

The present invention relates to a cellulose ester film, a method of manufacturing the cellulose ester film, a polarizing plate and a liquid crystal display, and in more detail, relates to a cellulose ester film which is excellent with respect to light leakage and color unevenness.

BACKGROUND OF THE INVENTION

Liquid crystal displays are widely applied for displaying apparatuses such as a TV set and a personal computer because the display can be operated with low electric power consumption and specifically because a thin display can be fabricated. A liquid crystal display is constituted by a liquid crystal cell having polarizing plates on both sides thereof, and the polarizing plate has a structure in which a polarizing film on which iodine or a dye is adsorbed and oriented is sandwiched between transparent resin layers on both sides. The transparent resin layers are provided to protect the polarizing film. A cellulose ester film is suitable for the resin layer and commonly used as the resin layer.

As the liquid crystal display has become popular in recent years, a thinner, larger screen or higher performance display has been desired, and according to the popularization of the liquid crystal display, a higher performance has also been desired for the cellulose ester film.

Specifically, according to the enlargement of the screen of the liquid crystal display, color unevenness or light leakage of an extent which has not been a problem has become obvious to be a problem, and a countermeasure for this problem has been required. A method to improve these performances by adjusting the properties of the cellulose ester film has been sought.

In Patent Document 1, an attention was paid on a property called as a "sound velocity" as relating to the problem of light leakage of the cellulose ester film. In this patent document, a technique to improve the quality of a display by suppressing light leakage has been proposed, in which the property of a cellulose ester film was adjusted in terms of the relationship between an amount of residual solvent and a drying temperature of the cellulose ester film. In Patent Document 2, proposed is a technique to reduce the variation of a retardation value caused by a change of circumstance such as humidity by adjusting the substitution degree of the cellulose acylate film in a prescribed value.

As a method to produce a cellulose ester film, a solution casting film formation method has been commonly earned out. In this method, a cellulose ester is dissolved in, for example, a halogen-containing solvent, the solution is cast on a belt or a drum which works as a support to form a film, and, after forming a film, the film is peeled from the support followed by drying to obtain a cellulose ester film.

Patent Documents 1 and 2 relate to a technique to control the property of a cellulose ester film by adjusting the producing condition in a solvent casting film forming method. In these patent documents, suppression of light leakage or variation of retardation has been proposed. However, when a cellulose ester film is produced in such a method, a problem of occurrence of color unevenness is newly arisen, due to uneven distribution, at the surface of the film, of a plasticizer or a UV absorber contained in the film or leaking out of an additive from the film, so called bleeding out, which may occur while the solvent is dried in the casting of drying process.

In order to reduce the color unevenness due to the uneven distribution or bleeding out of the additive, a cellulose ester film formed by a melt casing film forming method has been disclosed in Patent Document 3. In this method, a cellulose ester is heated to melt the cellulose ester and cast to form a film, without using a solvent. It has been known that, when a cellulose ester film is formed by a melt casting film forming method, color unevenness due to uneven distribution or bleeding out of an additive can be reduced because no solvent is used. However, when a cellulose ester film is formed by a melt casing film forming method, the property value of the cellulose ester film cannot be controlled by the amount of residual solvent or the film drying temperature as disclosed in Patent Document 1. Or, when a cellulose ester film is formed by a melt casing film forming method, the kind of able cellulose ester resin is limited, because it is necessary to lower the viscosity of the melt in order to maintain the mechanical strength or the flatness of the surface of the cellulose ester film. Accordingly, when a cellulose ester film is formed by a melt casing film forming method employing the method of Patent Document 3, the sound velocity of the cellulose ester film cannot be controlled, and, as the result, it was found that light leakage is caused. Further, the intensive study by the present inventor revealed that the sound velocity of a cellulose ester film affects the mechanical strength, flatness of the surface of the cellulose eater film. It was also found that the cellulose ester film produced by a melt casting film forming method is inferior with respect to color unevenness due to the uneven flatness of the film surface when compared with that of a cellulose ester film produced by a solution casting film forming method.

Accordingly, there has been no fully effective method to simultaneously overcome the problems of the light leakage and the color unevenness which have arisen according to the enlargement of the screen of the liquid crystal display.

Patent Document 1 Japanese Patent Application Publication Open to Public Inspection (hereafter referred to as JP-A) No. 2005-17574

Patent Document 2 JP-A No. 2006-30962

Patent Document 3 JP-A No. 2000-352620

DISCLOSURE OF THE INVENTION

Problem to be Solved by the Invention

An object of the present invention is to provide a cellulose ester film satisfying the condition: 0.95<(a content of a plasticizer on A surface)/(a content of the plasticizer on B surface) <1.05, provided that A surface represents one surface of the cellulose ester film and B surface represents the other surface of the cellulose ester film, exhibiting a high sound velocity, and being excellent with respect to light leakage and color unevenness, as well as to provide a film producing method of the cellulose ester film. A further object of the present invention is to provide a polarizing plate employing the aforementioned cellulose ester film and a liquid crystal display.

Means to Solve the Problem

The above objects of the present invention are achieved by the following structures.
1. A cellulose ester film comprising a cellulose ester, wherein
   the cellulose ester film satisfies a condition:
   0.95<(a content of a plasticizer on A surface)/(a content of a plasticizer on B surface)<1.05, provided that A surface represents one surface of the cellulose ester film and B surface represents the other surface of the cellulose ester film; and
   a sound velocity along at least one of a film transport direction and the lateral direction is 2.0-2.7 knits at 23° C. under 55% RH.
2. The cellulose ester film of Item 1 comprising a phosphorus-containing compound having a phosphonite structure or a phosphite structure.
3. The cellulose ester film of Item 1 or 2, wherein
   a total acyl substitution degree of the cellulose ester film is 2.5-2.9; and
   a propionyl substitution degree of the cellulose ester film is 1.0-1.5.
4. A film producing method of the cellulose ester film of Item 1 comprising the steps of:
   heating to melt a composition comprising the cellulose ester and an additive to a temperature at which the composition exhibits fluidity, whereby a melt of the composition is obtained;
   casting the melt followed by cooling; and
   stretching the cellulose ester film at a stretching rate of 1000%/min-30000%/min, the stretching rate being represented by following Equation (1):

stretching rate(%/min)=((a dimension after stretching)/(a dimension before stretching)−1)×100 (%)/a time needed for stretching(Min).　　Equation (1)

5. The film producing method of Item 4, wherein the cellulose ester film is stretched in the lateral direction at a stretching rate represented by above Equation (1) of 400%/min-1500%/min.
6. The film producing method of Item 4 or 5, wherein the cellulose ester film is stretched at 50%-200% in at least one of the film transport direction and the lateral direction.
7. A polarizing plate comprising the cellulose ester film of any one of Items 1 to 3 or a cellulose ester film produced by the film producing method of any one of Items 4 to 6.
8. A liquid crystal display comprising the polarizing plate of Item 7.

Effect of the Invention

According to the present invention, a cellulose ester film satisfying the condition: 0.95<(a content of a plasticizer on A surface)/(a content of the plasticizer on B surface)<1.05, provided that A surface represents one surface of the cellulose ester film and B surface represents the other surface of the cellulose ester film, exhibiting a high sound velocity, and being excellent with respect to light leakage and color unevenness can be provided, as well as a film producing method of the cellulose ester film. Also, a polarizing plate and a liquid crystal display employing the aforementioned cellulose ester film and exhibiting excellent productivity and visibility can be provided.

BRIEF DESCRIPTION OF THE DRAWING

FIG. 1 is a schematic flow sheet showing an apparatus to conduct the production method of the cellulose ester film of the present invention.

EXPLANATION OF NUMERALS

1 Extruder
2 Filter
3 Static mixer
4 Casting die
5 Rotary support (first cooling roll)
6 Pressure rotary member (touch roll)
7 Rotary support (second cooling roll)
8 Rotary support (third cooling roll)
9, 11, 13, 14 and 15 Conveyance roll
10 Cellulose ester film
16 Winding apparatus
12 Stretching apparatus (tenter)

DESCRIPTION OF THE PREFERRED EMBODIMENTS

The preferred embodiments of the present invention will be explained in detail below, however, the present invention is not limited thereto.

As described in Item 1, the cellulose ester film of the present invention is characterized in that the cellulose ester film contains a cellulose ester, satisfies the condition:
0.95<(a content of a plasticizer on A surface)/(a content of a plasticizer on B surface)<1.05, provided that A surface represents one surface of the cellulose ester film and B surface represents the other surface of the cellulose ester film; and exhibits a sound velocity along at least one of the film transport direction and the lateral direction of 2.0-2.7 km/s at 23° C. under 55% RH.

The aforementioned cellulose ester film can be obtained, as described in Item 4, by:
heating to melt a composition comprising the cellulose ester and an additive to a temperature at which the composition exhibits fluidity, whereby a melt of the composition is obtained;
casting the melt followed by cooling to obtain a cellulose ester film; and
stretching the cellulose ester film at a stretching rate of 1000%/min-30000%/min, the stretching rate being represented by following Equation (1):

stretching rate(%/min)=((a dimension after stretching)/(a dimension before stretching)−1)×100 (%)/a time needed for stretching(min).　　Equation (1)

As the result of an intensive investigation on the aforementioned problems, the following finding was obtained, and thus the present invention was achieved. Namely, in the further stretching process of a cellulose ester film obtained by a melt casting film forming method, the cellulose ester film was stretched at a stretching rate which had been impossible in the conventional melt casting film forming method due to rupture of the cellulose ester film to adjust the sound velocity of the cellulose ester film in the range of 2.0-2.7 km/s, whereby a cellulose ester film excellent with respect to light leakage and color unevenness was obtained.

The mechanism to obtain a cellulose ester film exhibiting a high sound velocity by adjusting a stretching rate is thought to be as follows in the present invention.

Namely, when the stretching rate is increased, the load applied to the film is also increased even when the stretching ratio is the same. As a result, a cellulose ester film exhibiting a high sound velocity can be obtained.

The sound velocity of the cellulose ester film of the present invention can be determined by leaving the film in the same circumstance of 23° C. and 55% RH for 24 hours and using SONIC SHEET TESTER (Type: SST-110, supplied by NOMURA SHOJI Co., Ltd.).

In the present invention, measurements were carried out at several points in the film plane, followed by averaging the obtained results.

The amount of the plasticizer on the surface of the film was determined by: collecting a 20 nm portion from A surface or from B surface of the film using a knife; measuring the weight of the portion; dissolving the portion in acetone; and determining the amount of plasticizer in the solution employing GC (gas chromatography).

In the following, the present invention will be described in detail.

<Cellulose Ester>

The cellulose ester to be used in the invention is a carboxylate having about 2 to 22 carbon atoms which may be an aromatic carboxylate and a lower fatty acid ester is particularly preferred though the cellulose ester is not specifically limited.

The lower carboxylic acid in the lower carboxylate of cellulose is a fatty acid having six or less carbon atoms. The acyl group bonding with the hydroxyl group may have a linear-chain or a branched chain, and may form a ring. The acyl group may have another substituent.

An acyl group having 2 to 6 carbon atoms is preferably selected because the large number of the carbon atoms causes lowering in the stiffness of the film when the substitution degree is the same.

The cellulose ester preferable according to the present invention is one simultaneously satisfying the following Formulas (i) and (ii).

$$2.5 \leq X+Y \leq 2.9 \quad \text{Formula (i)}$$

$$1.0 \leq Y \leq 1.5 \quad \text{Formula (ii)}$$

In the above formulas X is a substitution degree of an acetyl group and Y is that of a propionyl group or a butyryl group. X+Y represent a total substitution degree of an acyl group. It was found that a specifically improved reworking property when pasted in a polarizing plate can be obtained when the substitution degrees am within these ranges.

Among the above, a cellulose acetate propionate is preferably used. The substitution degree of the acyl group can be measured according to ASTM-D817-96.

The number average molecular weight (Mn) of the cellulose ester to be used in the present invention is preferably from 60000 to 300000 and more preferably from 70000 to 200000. The ratio of weight average molecular weight (Mw)/number average molecular weight (Mn) of the cellulose ester to be used in the present invention is preferably not more than 4.0 and more preferably from 1.4 to 2.3.

An average molecular weight and a distribution of the molecular weight of the cellulose ester can be measured using high-performance liquid chromatography. Accordingly, a weight average molecular weight (Mw), a number average molecular weight (Mn) and a ratio thereof can be calculated.

The measuring condition is as follows.
Solvent Methylene chloride
Column: SHOWDEX K806, K805 K803G (manufactured by SHOWA DENKO K. K). These three columns were connected to be used Concentration of sample: 0.1% by mass
Detector: RI Model 504 (manufactured by GL Science Co.)
Pump: L6000 (manufactured by Hitachi, Ltd.)
Flow rate: 1.0 ml/min
Calibration curve: a calibration curve based on 13 samples of standard polystyrene STK, (manufactured by Tosoh Corp.) Mw=500 to 1,000,000, was utilized. The intervals among the 13 samples are preferably almost equal.

Examples of a raw material cellulose include: cotton linter, wood pulp and kenaf although the raw material cellulose is not specifically limited. Cellulose esters obtained from these raw materials may be used in combination in an optional ratio.

The raw material cellulose for the cellulose ester to be used in the present invention may be wood pulp or cotton linter, and the wood pulp may be that of a needle-leaf tree or a broad-leaf tree, but that of the broad-leaf tree is more preferable. Cotton linter is preferably used in view of peeling properties at the time of film formation. Cellulose esters made from these materials may be suitably blended or used alone.

For example, the proportion of cellulose ester from cotton linter:cellulose ester from wood pulp (needle-leaf tree): cellulose ester from wood pulp (broad-leaf tree) may be 100:0:0, 90:10:0, 85:15:0, 50:50:0, 20:80:0, 10:90:0, 0:100:0, 0:0:100, 80:10:10, 85:0:15, and 40:30:30.

The cellulose ester according to the present invention may be synthesized via a well known method. It is also preferable that the synthesized cellulose ester is purified to remove a low molecular weight component, or a non-acylated component or a low-acylated component is removed by filtration.

The properties of a cellulose ester are influenced by residual amounts of metal components contained in the cellulose ester, which may be originated from the water used in the manufacturing process. Metal components which may cause insoluble cores should preferably be minimal. Metal ions such as iron, calcium or magnesium may form insoluble cores by forming salts in combination with decomposition products of polymers which may possibly contain organic acid groups. Accordingly these metal ions should be minimal.

The amount of residual sulfuric acid contained in the cellulose ester used in the present invention is preferably 0.1 through 45 ppm in terms of the sulfur element. They are considered to be included as salts. The amount of the residual sulfuric acid contained therein of exceeding 45 ppm is not preferable since the deposition on the die lip at the time of heat-melting increases and the film tends to tear off at the time of thermal stretching or slitting subsequent to thermal stretching. Further, the preferred amount is in the range of 1 through 30 ppm. The amount of residual sulfuric acid can be determined according to the method prescribed ASTM-D817-96.

The total amount of the free acid in the cellulose ester used in the present invention is preferably 1-500 ppm. When the total fee acid amount is within this range, the deposition on the die lip at the time of heat-melting is reduced and the film becomes more difficult to tear off. Further, in the present invention, the total fee acid amount is more preferably 1-100 ppm, whereby the film becomes further more difficult to tear off. Particularly preferably, the total fee acid amount is 1-70 ppm. The amount of free acid can be measured according to the method prescribed in ASTM-D817-96.

The amounts of residual alkali-earth metal, residual sulfuric acid and residual acid can be kept within the aforementioned range if the synthesized cellulose ester is washed more carefully than in the case of the solution casting method.

Further, the cellulose ester can be washed using, in addition to water, a poor solvent such as methanol or ethanol, or a mixed solvent of a poor solvent and a good solvent, if it is a poor solvent as a result. This will remove the inorganic substance other than residual acid, and low-molecular organic impurities.

Further, it is preferable that, when the cellulose ester employed in the present invention is formed into a film, the resulting film produces minimal foreign matter bright spots. The number of foreign matter bright spots of which diameter is 0.01 mm or more is preferably 200 or less, more preferably 100 or less, still more preferably 50 or less, further more preferably 30 or less, yet more preferably 10 or less, but most preferably zero. The number of foreign matter bright spots of which diameter is 0.005-0.01 mm is preferably 200 or less, more preferably 100 or less, still more preferably 50 or less, further more preferably 30 or less, yet more preferably 10 or less, but most preferably zero.

The cellulose ester according to the present invention may contain: a plasticizer which provides a workability to the film; an antioxidant which prevent deterioration of the film; a UV absorber which provides a UV absorbing function to the film; particles (matting agent) which provides a lubricating property to the film; and a retardation controlling agent which control the retardation of the film.

<Plasticizer>

It is preferable to incorporate at least one plasticizer to a film forming material in the process of producing the cellulose ester film of the present invention.

The plasticizers are additives having a function to improve brittleness and to impart flexibility. In the present invention, a plasticizer is added to reduce the melting temperature of the material composing the film to be lower than the melting temperature of the cellulose ester alone, and to lower the viscosity of the materials composing the film to be less than that of the cellulose ester alone, even if the temperature is the same. Also, a plasticizer can suppress the rapture of the film when the film is stretched in a higher stretching ratio.

Also, a plasticizer has a function as an anti-moisture-permeation agent which improves the hydrophilicity of the cellulose ester so that the coefficient of water vapor permeability of the cellulose ester films is improved.

The melting temperature of the materials composing the film, as described herein, refers to a temperature at which the material exhibits fluidity by heating. It is necessary to heat the cellulose ester at a temperature higher than the glass transition temperature to make the cellulose ester melt and fluidize.

At or above the glass transition temperature, the elastic modulus or viscosity decreases due to heat absorption, whereby fluidity is observed. However, at higher temperatures, cellulose ester melts and simultaneously undergoes thermal decomposition to result in a decrease in the molecular weight of the cellulose ester, whereby the physical properties of the resulting film may be adversely affected. Consequently, it is preferable to melt cellulose ester at a temperature as low as possible.

Lowering the melting temperature of the film forming materials is achieved by the addition of a plasticizer having a melting point or a glass transition temperature which is lower than the glass transition temperature of the cellulose ester.

In the present invention, the plasticizer may be used alone or in combination of 2 or more kinds, and preferably at least contains a polyalcohol ester plasticizer having a molecular weight of 350-1500, and having a structure obtained by condensing an organic acid and an alcohol of trivalent or more. Other plasticizers usable in the present invention is not specifically limited, but preferably includes, for example, a polyalcohol ester plasticizer, a glycolate plasticizer, a phthalate plasticizer, an aliphatic acid ester plasticizer, a polymer plasticizer and a sugar ester plasticizer.

The using amount of plasticizer of less than 1% by mass based on the mass of the cellulose derivative is not preferable because the effect to lower the moisture permeability of the film is small, and, when the amount of plasticizer exceeds 20% by mass, the high temperature durability of the property of the film is deteriorated. Accordingly, the using amount of a plasticizer is preferably 1-20% by mass based on the mass of the cellulose derivative.

<Polyalcohol Ester Compounds>

The organic acid according to the present invention is represented by Formula (1).

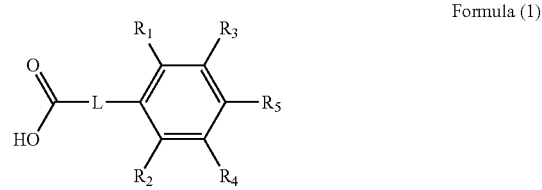

Formula (1)

In Formula (1), $R_1$-$R_5$ each are a hydrogen atom, a cycloalkyl group, an aralkyl group, an alkoxy group, a cycloalkoxyl group, an aryloxy group, an aralkyloxy group, an acyl group, a carbonyloxy group, an oxycarbonyl group, and an oxycarbonyloxy group, and these groups may further be substituted. L represents a linkage group, including a substituted or unsubstituted alkylene group, an oxygen atom, or a single bond.

The cycloalkyl group represented by $R_1$-$R_5$ is preferably a cycloalkyl group having 3-8 carbon atoms and specific examples thereof include cyclopropyl, cyclopentyl, and cyclohexyl. These groups may be substituted and examples of a preferred substituent include a halogen atom, such as a chlorine atom, a bromine atom, a fluorine atom, a hydroxyl group, an alkyl group, an alkoxy group, a cycloalkoxy group, an aralkyl group (a phenyl group of which may be substituted by an alkyl group, a halogen atom or the like), an alkenyl group such as a vinyl group or an allyl group, a phenyl group (a phenyl group of which may be substituted by an alkyl group, a halogen atom or the like), a phenoxy group (a phenyl group of which may be substituted by an alkyl group, a halogen atom or the like), an acyl group having 2-8 carbon atoms such as an acetyl or propionyl group, and an unsubstituted carbonyloxy group having 2-8 carbon atoms, such as an acetyloxy or propionyloxy group.

The aralkyl group represented by $R_1$-$R_5$ includes, for example, a benzyl group, a phenethyl group and a γ-phenylpropyl group, which may be substituted, and preferred substituents are the same as cited in the foregoing cycloalkyl group.

The alkoxy group represented by $R_1$-$R_5$ includes an alkoxy group having 1-8 carbon atoms. Specific examples thereof inch de alkoxy groups such as methoxy, ethoxy, n-propoxy, n-butoxy, n-octyloxy, isopropoxy, isobutoxy, 2-ethylhexyloxy, and t-butoxy.

These groups may be substituted and examples of a preferred substituent include a halogen atom such as a chlorine atom, bromine atom or a fluorine atom, a hydroxy group, an alkoxy group, a cycloalkoxy group, an aralkyl group (in which a phenyl group may be substituted by an alkyl group or a halogen atom), an alkenyl group, a phenyl group (which may be substituted by an alkyl group, a halogen atom or the like), an aryloxy group [for example, a phenoxy group (in which a phenyl group may be substituted by an alkyl group or a halogen atom)], an acyl group such as an acetyl group or propionyl group, an unsubstituted acyloxy group having 2-8 carbon atoms, such as acetyloxy group or a propionyloxy group, and an arylcarbonyloxy group such as benzoyloxy group.

The cycloalkoxy group represented by $R_1$-$R_5$ includes an unsubstituted cycloalkoxy group having 1-8 carbon atoms, and specific examples thereof include cyclopropyloxy, cyclopentyloxy and cyclohexyloxy.

These groups may be substituted and preferred substituents are the same as cited in the foregoing cycloalkyl group.

The aryloxy group represented by $R_1$-$R_5$ includes a phenoxy group, in which a phenyl group may be substituted by a substituent such as an alkyl group or a halogen atom, as cited in the foregoing cycloalkyl group.

The aralkyloxy group represented by $R_1$-$R_5$ includes a benzyloxy group and a phenethyloxy group, which may be substituted by a substituent and preferred substituents are those as cited in the foregoing cycloalkyl group.

The acyl group represented by $R_1$-$R_5$ includes an unsubstituted acyl group such as an acetyl group or propionyl group (in which a hydrocarbon group of the acyl group includes an alkyl group, an alkenyl group and an alkynyl group), which may be substituted by a substituent and preferred substituents are those as cited in the foregoing cycloalkyl group.

The carbonyloxy group represented by $R_1$-$R_5$ includes an unsubstituted an acyloxy group having 2-8 carbon atoms such as an acetyloxy group or propionyloxy group (in which a hydrocarbon group of the acyl group include an alkyl group, an alkenyl group and an alkynyl group) and an arylcarbonyloxy group such as benzoyloxy, which may be substituted by a substituent and preferred substituents are those as cited in the foregoing cycloalkyl group.

The oxycarbonyl group represented by $R_1$-$R_5$ includes an alkoxycarbonyl group such a methoxycarbonyl group, an ethoxycarbonyl group or a propyloxycarbonyl group, and an aryloxycarbonyl group such as a phenoxycarbonyl group.

These groups may be substituted by a substituent and preferred substituents are those as cited in the foregoing cycloalkyl group.

The oxycarbonyloxy group represented by $R_1$-$R_5$ includes an alkoxycarbonyloxy group having 1-8 carbon atoms such as a methoxycarbonyloxy group, which may be substituted by a substituent and preferred substituents are those as cited in the foregoing cycloalkyl group.

Any ones of $R_1$-$R_5$ may be combined with each other to form a ring.

The linkage group represented by L represents a substituted or unsubstituted alkylene group, an oxygen atom, or a single bond. The alkylene group includes a methylene group, an ethylene group and a propylene group, which may be substituted by the same substituents as cited in those for the group represented by $R_1$-$R_5$.

The linkage group represented by L preferably is a single bond or an aromatic carboxylic acid.

In the present invention, the organic acid represented by Formula (1) which constitutes the ester compound used as a plasticizer preferably contains aforementioned alkoxy group, acyl group, oxycarbonyl group, carbonyloxy group or oxycarbonyloxy group as at least $R_1$ or $R_2$. A compound having plural substituents is also preferable.

In the present invention the organic acid which is substituted for hydroxyl groups of a or more-valent alcohol may be a single kind of acid or plural kinds of acids.

A tri- or more-valent alcohol which reacts with the foregoing organic acid represented by Formula (1) to form a polyvalent alcohol ester compound is preferably an aliphatic polyvalent alcohol having a valence of 3 to 20 and in the present invention, the tri- or more-valent alcohol is preferably represented by the following Formula (2):

Formula (2)

wherein R' is an m-valent organic group, m is a positive integer of 3 or more and OH is an alcoholic hydroxyl group. A polyvalent alcohol having m of 3 or 4 is specifically preferred.

Following compounds may be cited as preferable examples of a polyvalent alcohol, however, the present invention is not limited thereto.

Preferred examples of a polyvalent alcohol include adonitol, arabitol, 1,2,4-butanetriol, 1,2,3-hexanetriol, 1,2,6-hexanetriol, glycerin, diglycerin, erythritol, pentaerythritol, dipentaerythritol, tripentaerythritol, galactitol, glucose, cellobiose, inositol, mannitol, 3-methylpentane-1,3,5-triol, pinacol, sorbitol, trimethylolpropane, trimethylolethane and xylitol.

Of these, glycerin, trimethylethane, trimethylolpropane and pentaerythritol are preferred.

A polyalcohol ester formed of an organic acid represented by Formula (1) and a polyvalent alcohol having a valence of 3 or more can be synthesized according to commonly known methods. Although representative synthesis examples are shown in Examples, there are cited, for example, a method in which an organic acid represented by the Formula (1) and a polyvalent alcohol represented by Formula (2) are condensed in the presence of an acid to form an ester; a method in which an organic acid is preliminarily transformed to an acid chloride or an acid anhydride, which is reacted with a polyvalent alcohol; and a method in which a phenyl ester of an organic acid and a polyvalent alcohol are reacted. It is preferred to choose an appropriate method exhibiting high yield according to the targeted ester compound.

A plasticizer of an ester formed of an organic acid represented by the Formula (1) and a polyvalent alcohol having a valence of 3 or more represented by the Formula (2) is preferably a compound represented by the following Formula (3):

Formula (3)

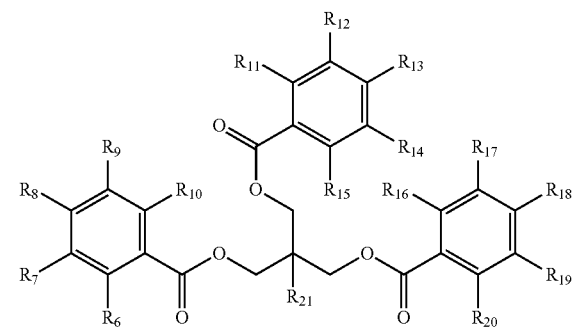

In the above formula, $R_6$ through $R_{20}$ each are a hydrogen atom, a cycloalkyl group, an aralkyl group, an alkoxy group, a cycloalkoxy group, an aryloxy group, an aralkyloxy group, an acyl group, a carbonyloxy group and oxycarbonyloxy group, and these groups may further be substituted by a substituent. $R_{21}$ is a hydrogen atom or an alkyl group.

The cycloalkyl group, aralkyl group, alkoxy group, cycloalkoxy group, aryloxy group, aralkyloxy group, acyl group, carbonyloxy group and oxycarbonyloxy group of $R_6$ through $R_{20}$ are the same as cited in the foregoing $R_1$-$R_5$.

Specific examples of a polyvalent alcohol ester relating to the present invention are shown below.
1
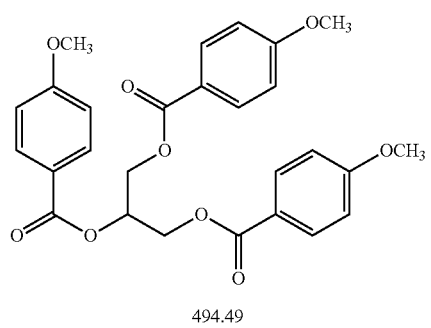
494.49
2
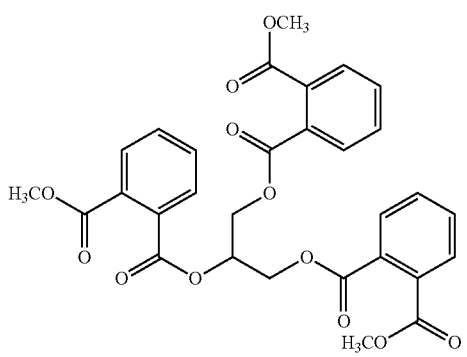
578.52
3
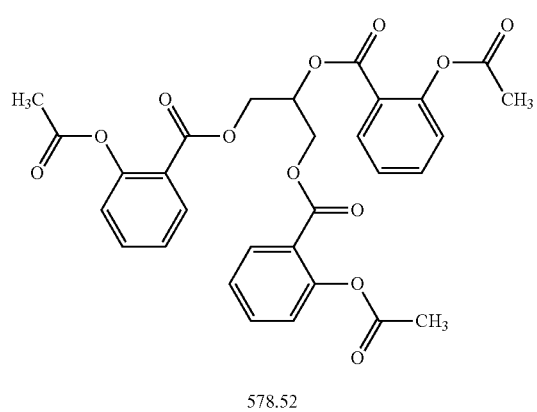
578.52
4
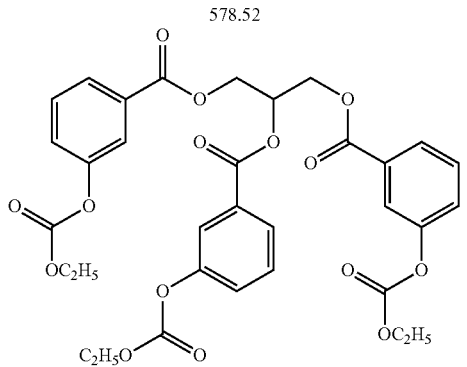
668.60
5
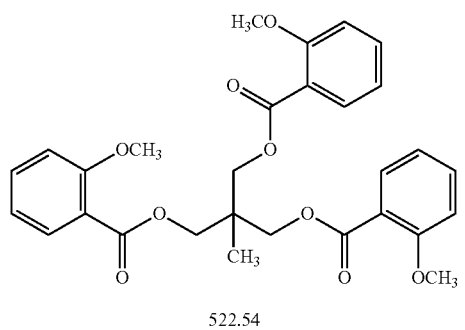
522.54
6
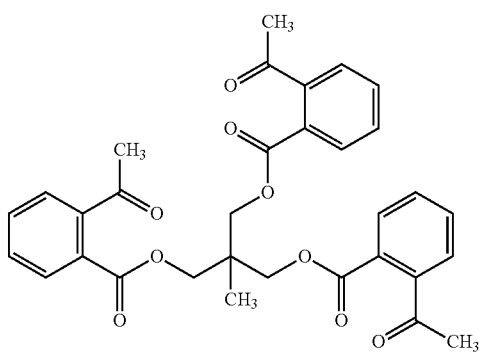
558.58
7
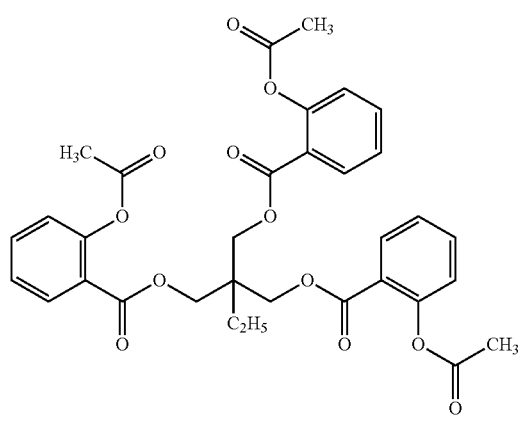
620.60
8
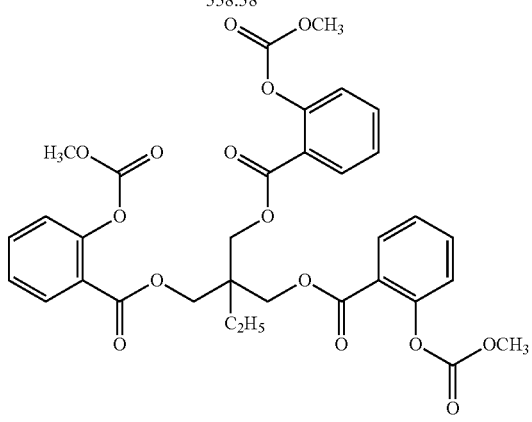
668.60

-continued
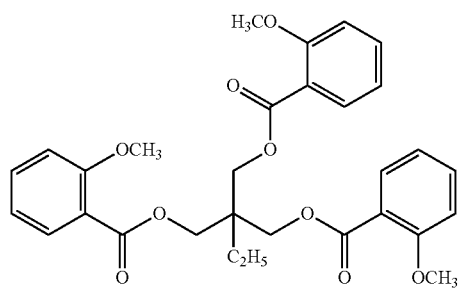
9
536.57
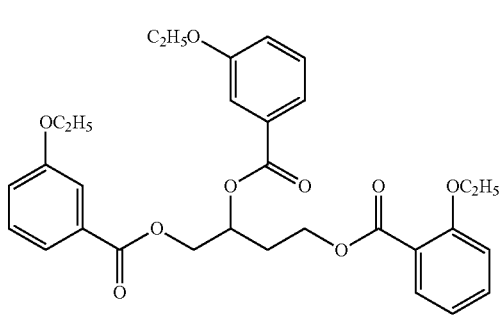
10
550.60
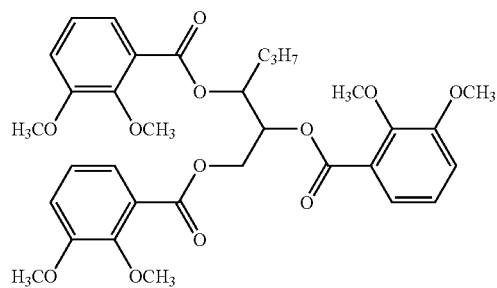
11
626.65
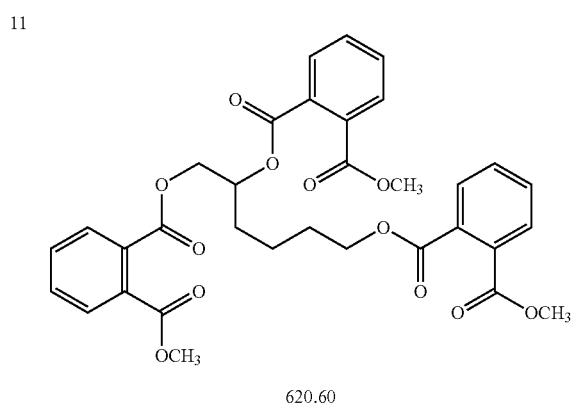
12
620.60
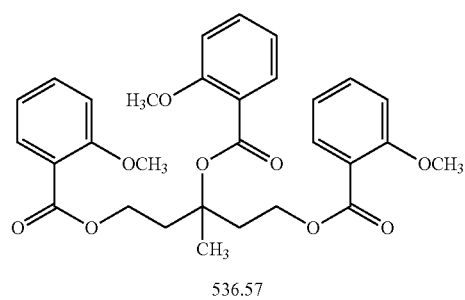
13
536.57
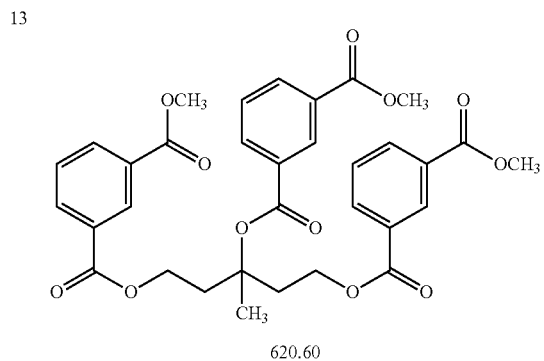
14
620.60
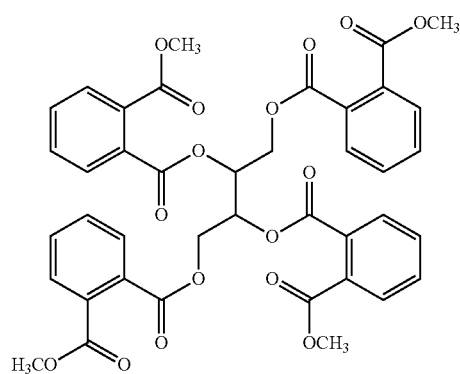
15
770.69
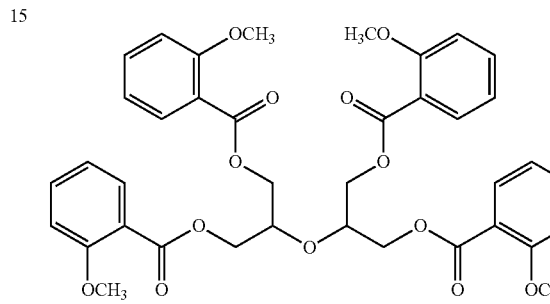
16
702.70

-continued
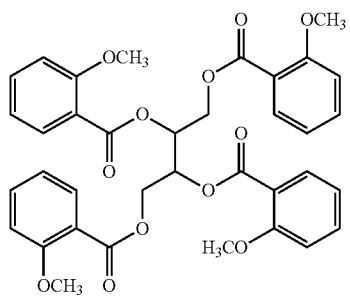
658.65
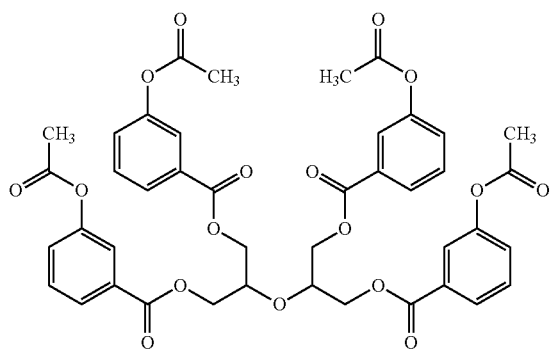
814.74
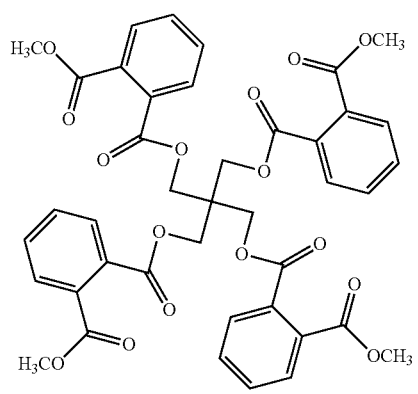
784.71
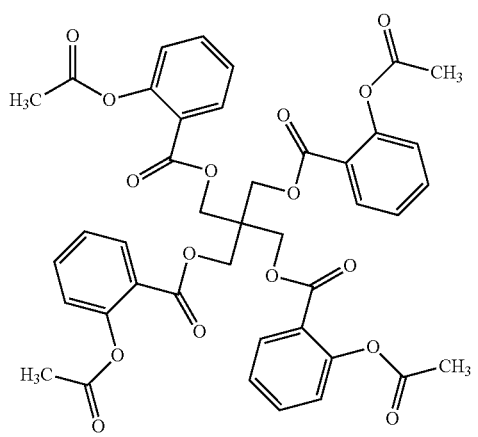
784.71
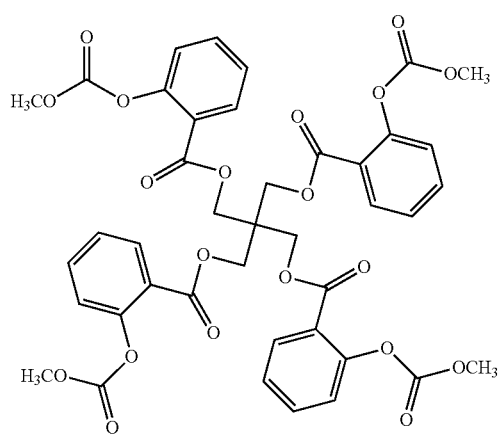
848.71
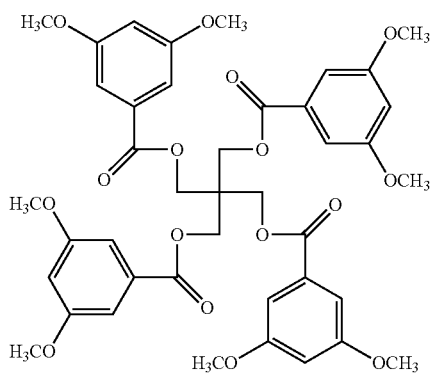
792.78

-continued
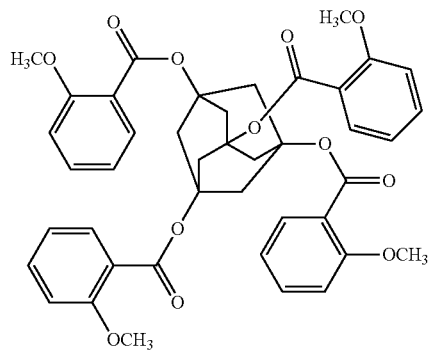
736.76
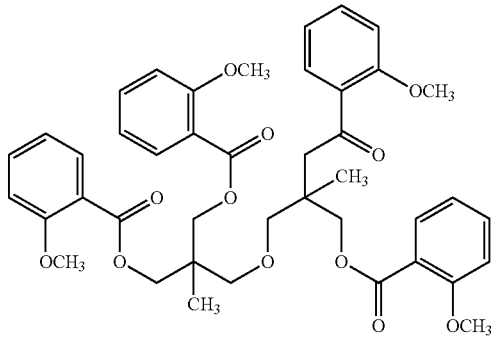
742.81
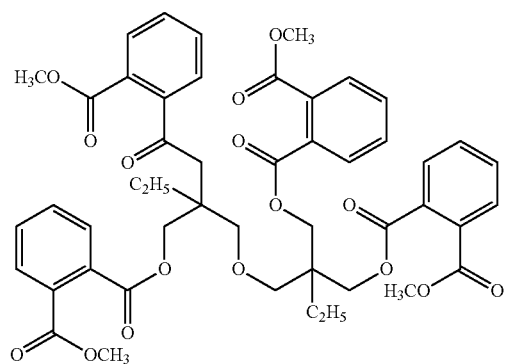
882.90
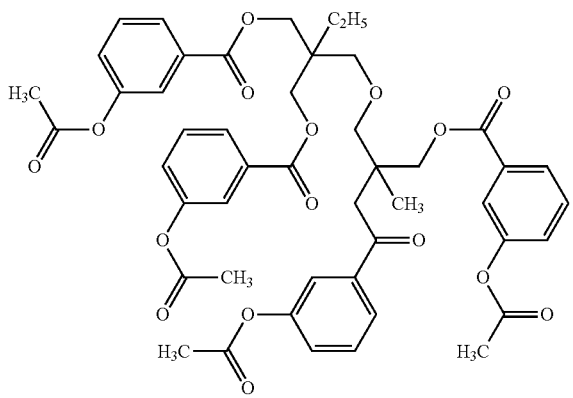
868.87
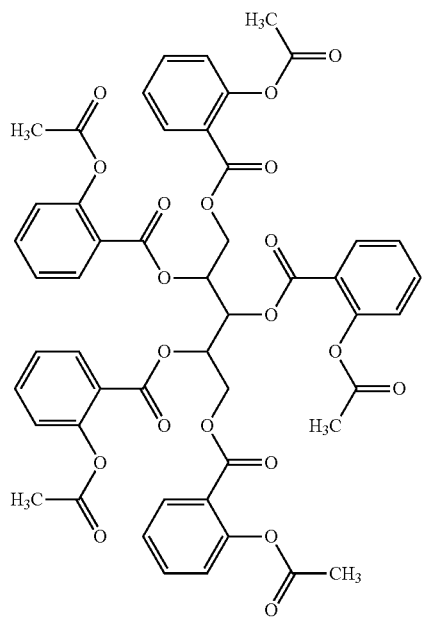
962.86
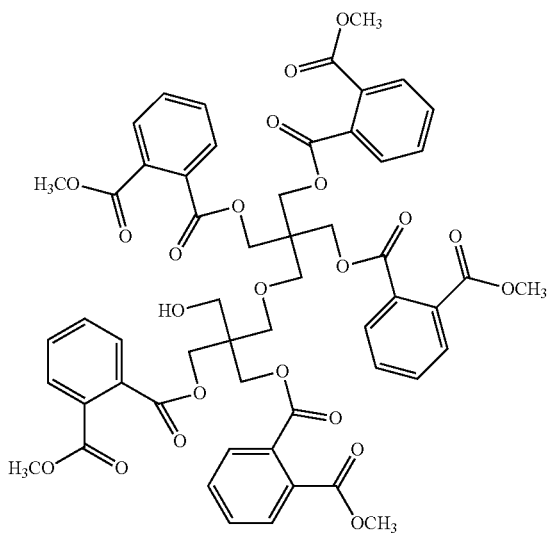
1064.99

-continued
29
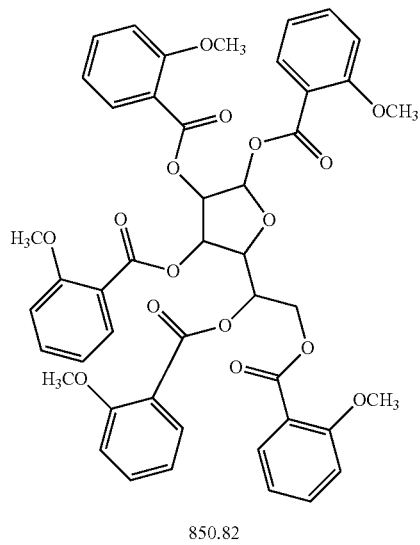
850.82
30
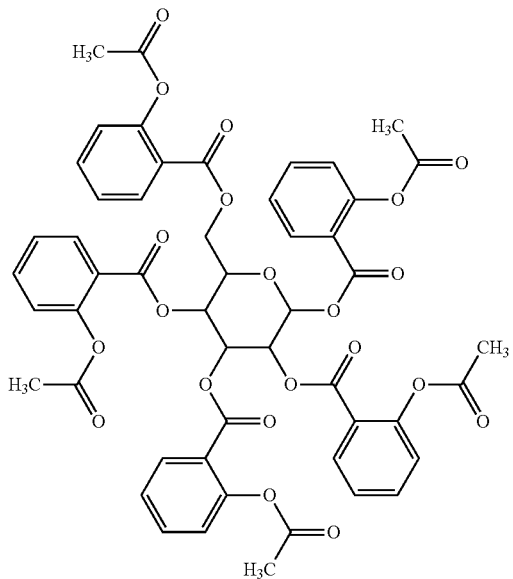
990.87
31
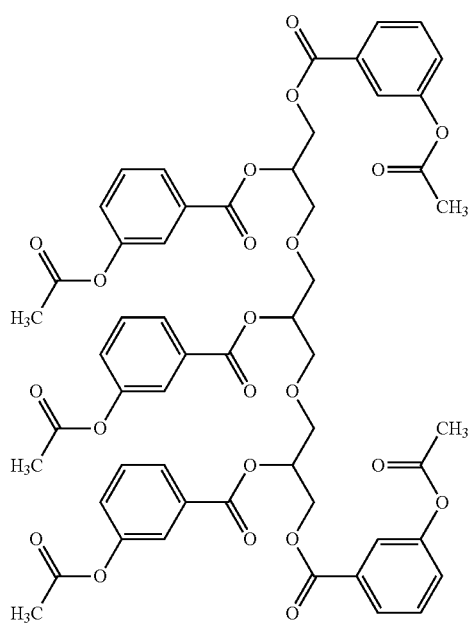
1050.96
32
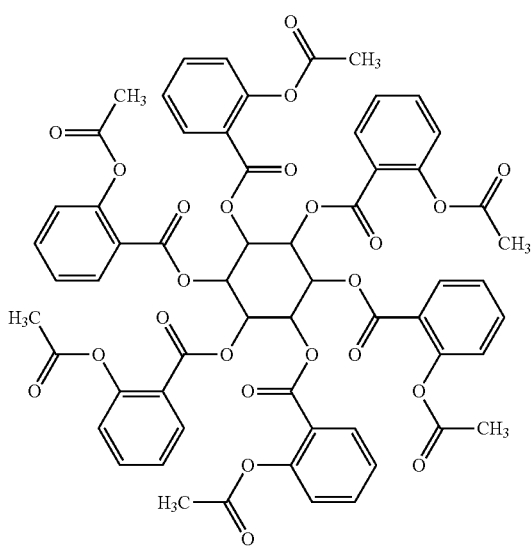
1153.01

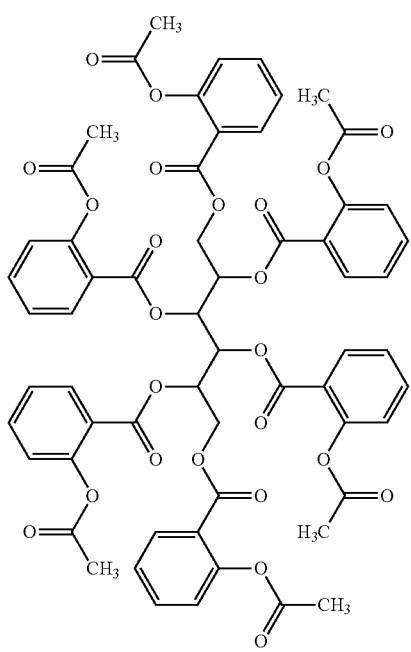
1155.02
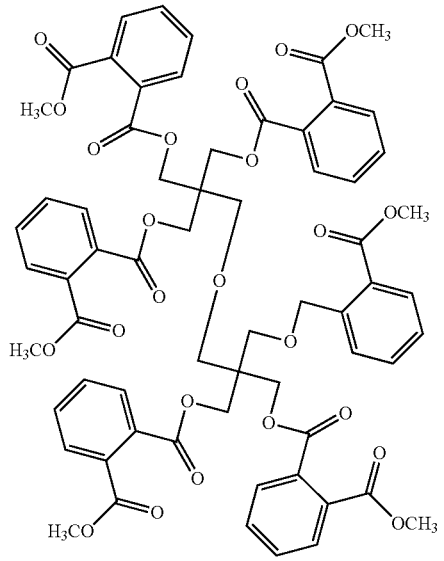
1213.15
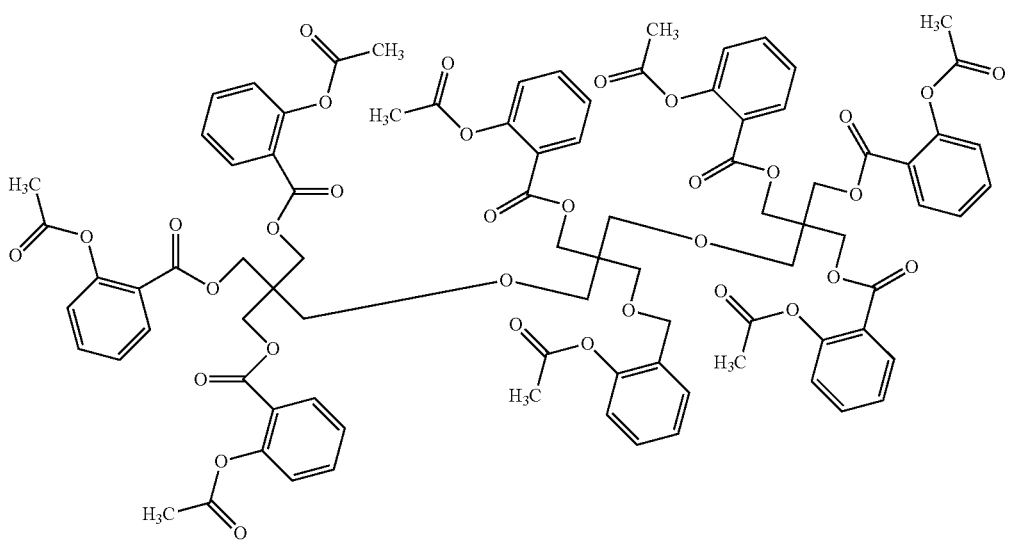
1669.59

36
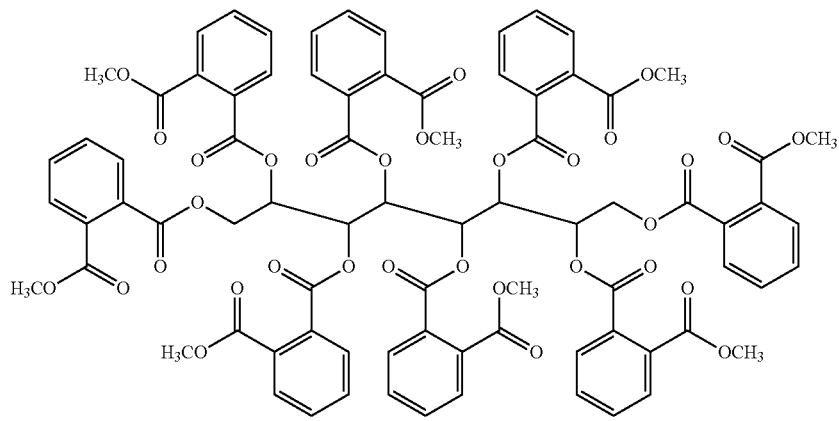
1539.36
37
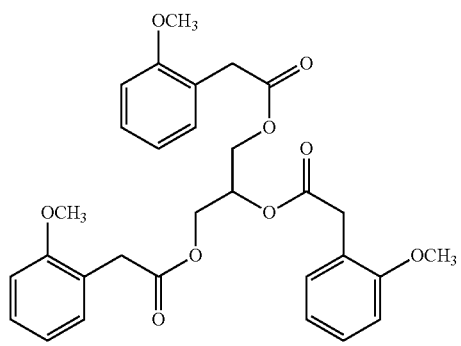
536.57
38
626.52
39
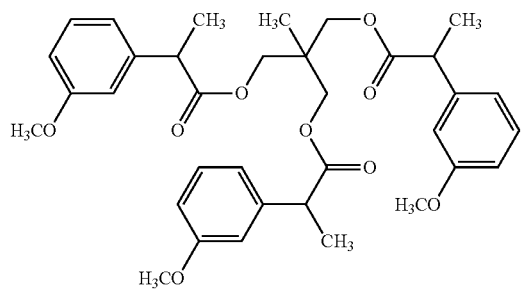
606.70
40
662.68

-continued
41
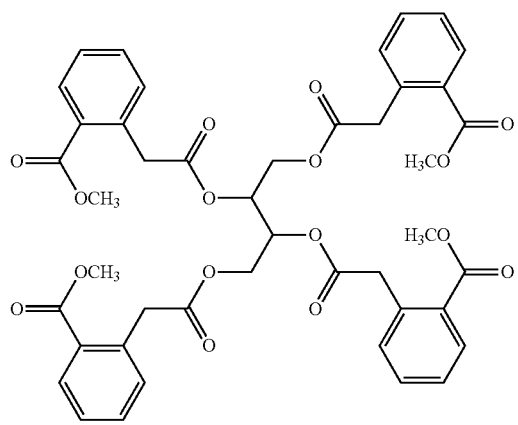
826.79
42
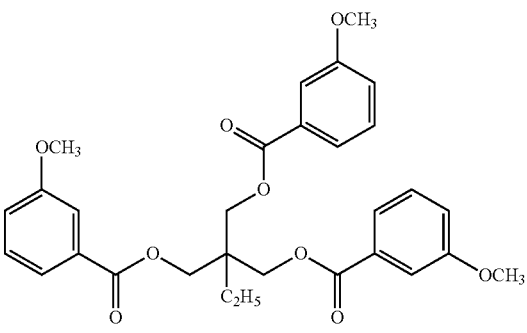
536.57
43
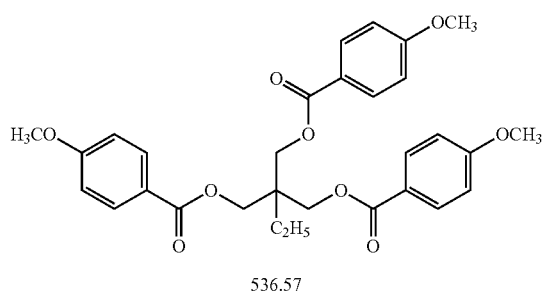
536.57
44
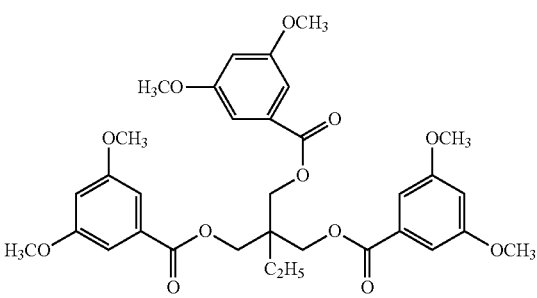
626.65
45
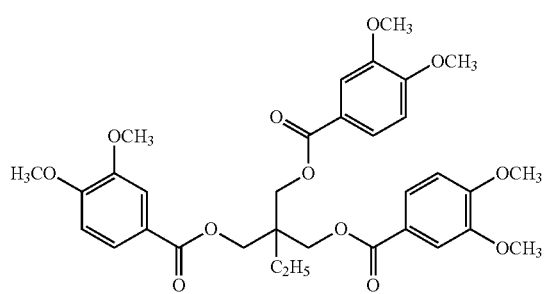
626.65
46
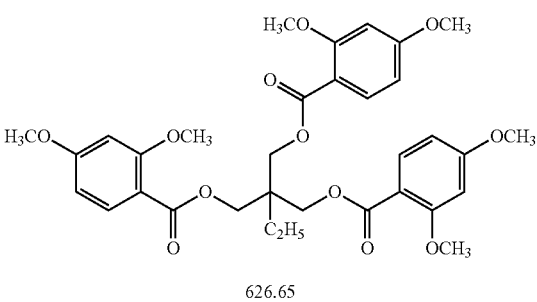
626.65
47
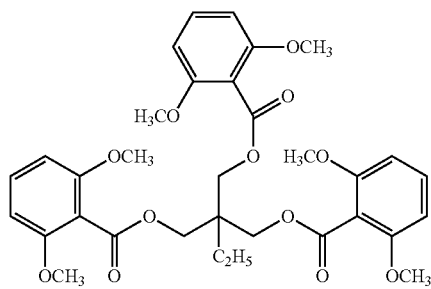
626.65
48
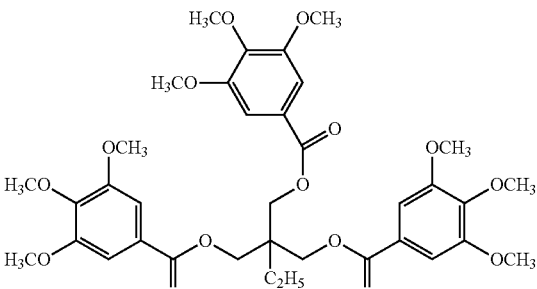
716.73

-continued
49
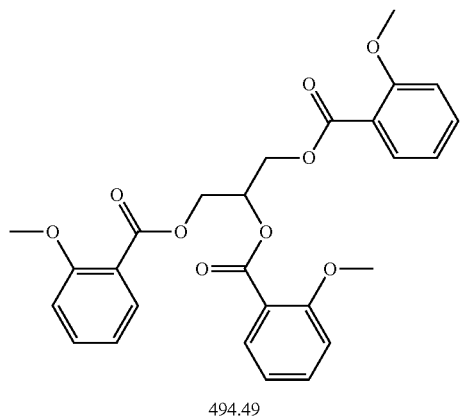
494.49
50
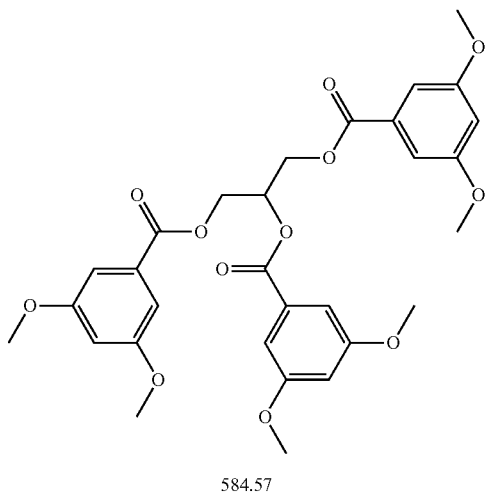
584.57
51
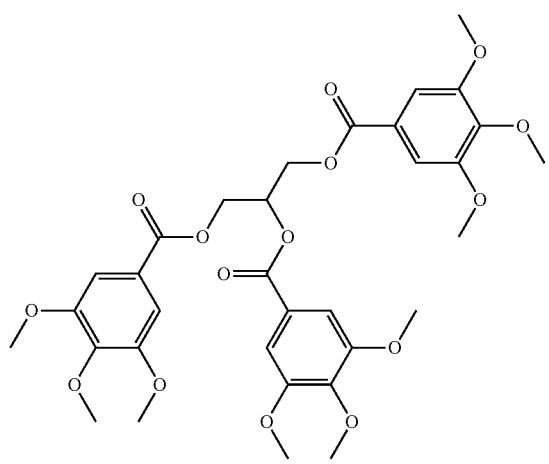
674.65
52
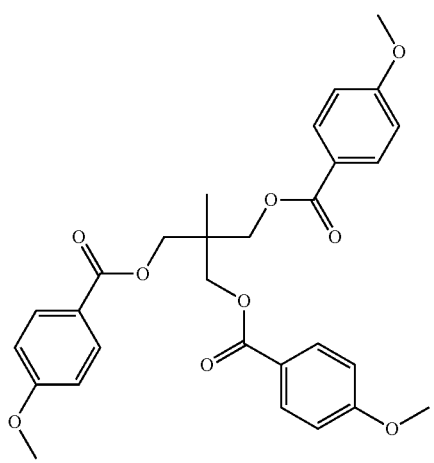
522.54
53
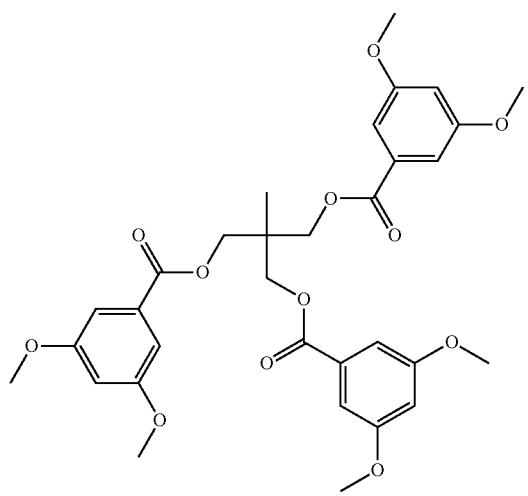
612.62
54
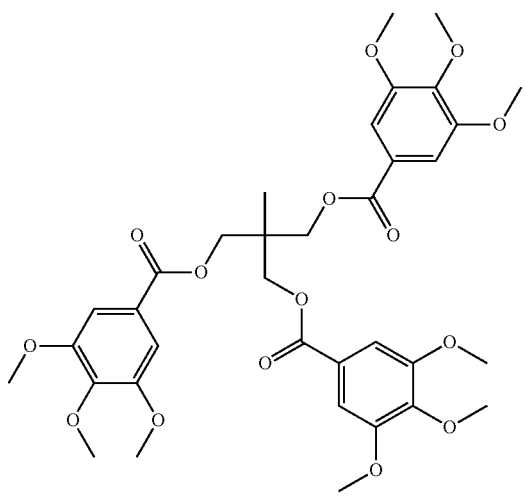
702.70

55
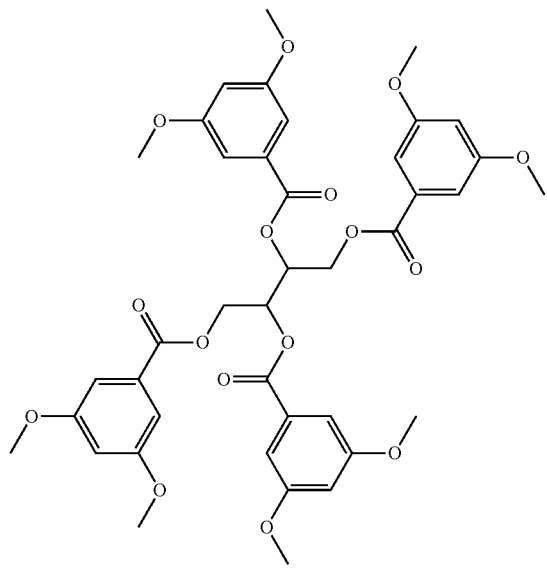
778.75
56
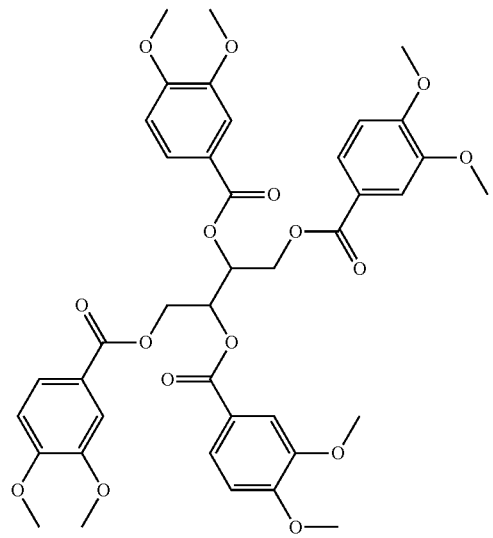
778.75
57
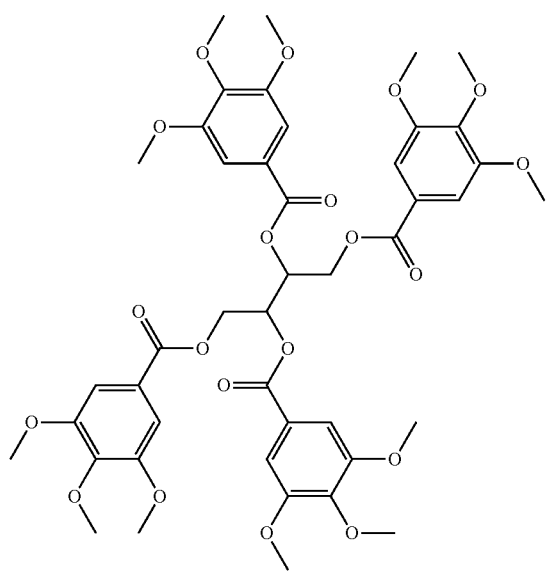
898.86
58
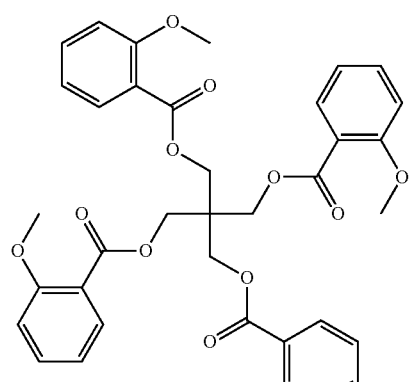
672.67

31
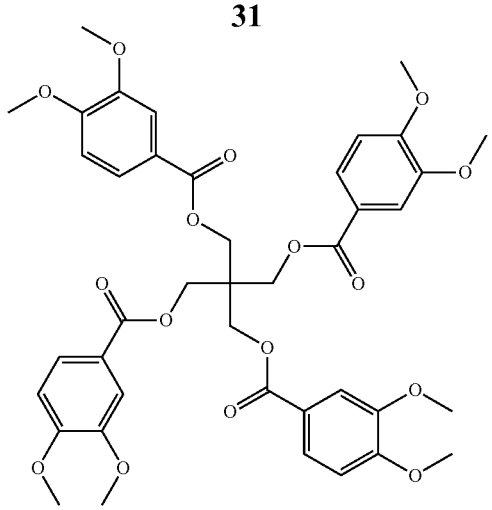
792.78
32
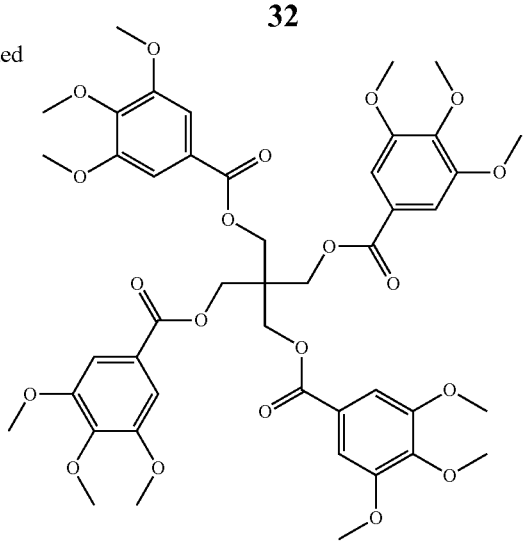
912.88
61
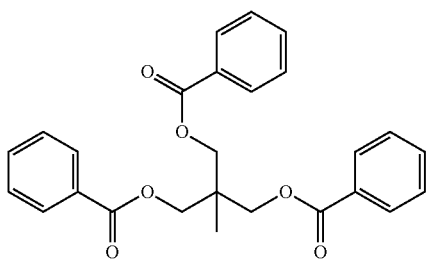
62
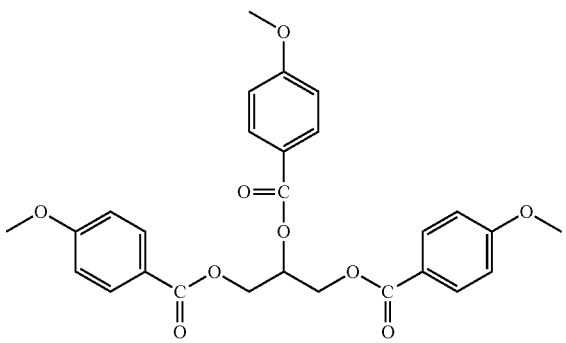
63
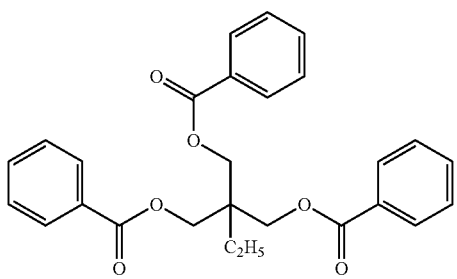
64
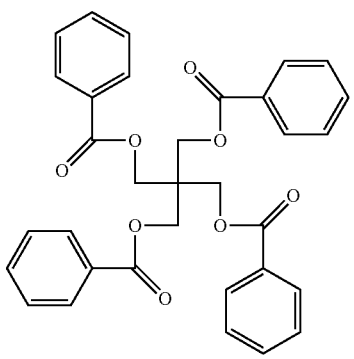
65
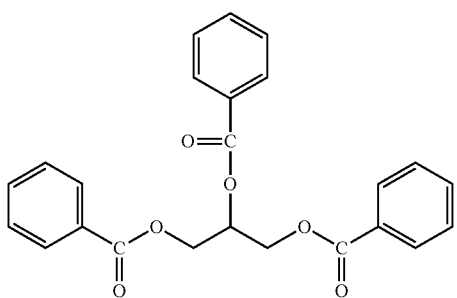

<Sugar Ester Plasticizer>

The cellulose ester film of the present invention preferably employs a sugar ester plasticizer which is obtained by esterifying the hydroxyl groups of a sugar compound in which 1-12 units of at least one of a furanose structure or a pyranose structure are bonded.

Examples of a sugar ester compound employed in the present invention include glucose, galactose, mannose, fructose, xylose, arabinose, lactose, sucrose, cellobiose, cellotriose, maltotriose and raffinose. Specifically preferable is a compound having both a furanose structure and a pyranose structure, such as sucrose.

The sugar ester plasticizer used in the present invention is a sugar compound of which hydroxyl groups are partly esterified or totally esterified, or a mixture thereof.

<Polymeric Plasticizer>

The cellulose ester film of the present invention preferably employs a polymeric plasticizer.

Among the polymeric plasticizers, acrylic polymer is preferable. Specific examples of a polymeric plasticizer include: an aliphatic hydrocarbon polymer; an alicyclic hydrocarbon polymer; an acryl polymer such as poly(ethyl acrylate), poly (methyl methacrylate) or a copolymer of methyl methacrylate and 2-hydroxyethyl methacrylate (for example, an arbitrary copolymer ratio in the range of 1:99 to 99:1); a vinyl polymer such as poly(vinyl isobutyrate) or poly-N-vinylpyrrolidone; a copolymer of methyl methacrylate and N-vinylpyrrolidone (for example, an arbitrary copolymer ratio in the range of 1:99 to 99:1); a styrene polymer such as polystyrene or poly(4-hydroxystyrene); a copolymer of methyl methacrylate and 4-hydroxystylene (for example, an arbitrary copolymer ratio in the range of 1:99 to 99:1); a polyester such as polybutylene succinate), poly(ethylene terephthalate) or poly(ethylene naphthylate); a polyether such as polyethylene oxide or polypropylene oxide; a polymamide; a polyurethane and a polyurea. A number average molecular weight is preferably from 1,000 to 500,000 and more preferably from 5,000 to 200,000. A molecular weight of less than 1,000 causes problems in volatility and a molecular weight of more than 500,000 results in reduced plasticity and adversely affects a mechanical property of cellulose ester film. These polymeric plasticizers may be a homopolymer comprised of a single repeating unit or a copolymer comprised of plural repeating units. Two or more of the foregoing polymers may be used in combination.

The method of measuring the amount of plasticizer on the surface is not specifically limited, however, a method to collect a 20 nm portion from the surface of the film followed by being subjected to a quantitative analysis or a method to scan the amount of plasticizer using an IR analysis or atomic absorption may be cited.

<Antioxidant>

In the cellulose ester film according to the present invention, commonly known materials may be used as an antioxidant. Specifically, a lactone compound, a sulfur-containing compound, a phenol compound, a compound having a double bond, a hindered amine compound, or a phosphorus-containing compound is preferably employed. Specifically, a phosphorus-containing compound is preferably employed. It was found that, when a phosphorus-containing compound was used, an excellent transparency was obtained even when the film may be colored.

<Phosphorus-Containing Compound>

As the phosphorus-containing compound used in the present invention, a well-known compound may be used. The preferred one is selected from the group consisting of a phosphite, a phosphonite, a phosphinite and a tertiary phosphane. Preferred are those disclosed, for example, in JP-A No. 2002-138188, in paragraphs 0022 through 0027 of JP-A No. 2005-344044, in paragraphs 0023 through 0039 of JP-A No. 2004-182979, in JP-A Nos. 10-306175, 1-254744, 2-270892, 5-202078, 5-178870, 2004-504435, and 2004-530759, and in Japanese Patent Application No. 2005-353229. Further preferable phosphorus-containing compound includes a phosphonite compound represented by following Formula (4) or (5).

$$R^{31}P(OR^{32})_2 \qquad \text{Formula (4)}$$

$$(R^{34}O)_2PR^{33}\text{---}R^{33}P(OR^{34})_2 \qquad \text{Formula (5)}$$

In Formula (4) above, $R^{31}$ represents a substituted or unsubstituted phenyl group or a thienyl group; and $R^{32}$ represents an alkyl group which may have a substituent, a phenyl group which may have a substituent, a thienyl group which may have a substituent, provided that plural $R^{32}$ may combine with each other to form a ring. $R^{32}$ is preferably a substituted phenyl group. The total carbon atom number of the substituent of the substituted phenyl group is preferably 9 to 14, and more preferably 9 to 11.

The substituent is not specifically limited, but examples of the substituent include an alkyl group (for example, a methyl group, an ethyl group, a propyl group, an isopropyl group, a t-butyl group, a pentyl group, a hexyl group, an octyl group, a dodecyl group, or a trifluoromethyl group), a cycloalkyl group (for example, a cyclopentyl group or a cyclohexyl group), an aryl group (for example, a phenyl group, or a naphthyl group), an acylamino group (for example, an acetylamino group, or a benzoylamino group), an alkylthio group (for example, a methylthio group, or an ethylthio group), an arylthio group (for example, a phenylthio group or a naphthylthio group), an alkenyl group (for example, a vinyl group, 2-propenyl group, a 3-butenyl group, a 1-methyl-3 propenyl group, a 3-pentenyl group, a 1-methyl-3-butenyl group, a hexenyl group or a cyclohexenyl group), a halogen atom (for example, fluorine, chlorine, bromine, iodine), an alkinyl group (for example, a propargyl group), a heterocyclic group (for example, pyridyl group, a thiazolyl group, an oxazolyl group or an imidazolyl group), an alkylsulfonyl group (for example, a methylsulfonyl group or an ethylsulfonyl group), an arylsulfonyl group (for example, a phenylsulfonyl group or a naphthylsulfonyl group), a sulfinyl group (for example, a methylsulfinyl group), an arylsulfonyl group (a phenylsulfinyl group), a phosphono group, an acyl group (for example, an acetyl group, a pivaloyl group or a benzoyl group), a carbamoyl group (for example, an aminocarbonyl group, a methylaminocarbonyl group, a dimethylaminocarbonyl group, a butylaminocarbonyl group, a cyclohexylaminocarbonyl group, a phenylaminocarbonyl group, or a 2-pyridylaminocarbonyl group), a sulfamoyl group (for example, an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group or a 2-pyridylaminosulfonyl group), a sulfonamide group (for example, a methanesulfonamide group or a benzene sulfonamide group), a cyano group, an alkoxy group (for example, a methoxy group, an ethoxy group, or a propoxy group), an aryloxy group (for example, a phenoxy group or a naphthyloxy group), a heterocycleoxy group, a silyloxy group, an acyloxy group (for example, an acetyloxy group, or a benzoyloxy group), a sulfonic acid group, a sulfonate group, an aminocarbonyloxy group, an amino group (for example, an amino group, an ethylamino group, a dimethylamino group, a butylaminocarbonyl group, a cyclopentylamino group, a 2-ethylhexylamino group, or a dodecylamino group), an anilino group (for example, a phenylammino group, a chlorophenylammino group, a toluidino group, an anisidino group, a naphthylamino group or a 2-pyridylamino group), an imino group, a ureido group (for example, a methylureido group, an ethylureido group, a pentylureido group, a cyclohexylureido group, an octylureido group, a dodecylureido group, a phenylureido group, a naphthylureido group, or a 2-pyridylaminoureido group), an alkoxycarbonylamino group (for example, a methoxycarbonylamino group or a phenoxycarbonylamino group), an alkoxycarbonyl group (for example, a methoxycarbonyl group or an ethoxycarbonyl group), an aryloxycarbonyl group (for example, a phenoxycarbonyl group), a heterocyclicthio group, a thioureido group, a carboxyl group, a carboxylate group, a hydroxyl group, a mercapto group, and a nitro group. These substituents may further have the substituent as described above.

In Formula (5), $R^{33}$ represents a phenylene group which may have a substituent or a thienylene group which may have a substituent; and $R^{34}$ represents an alkyl group which may have a substituent, a phenyl group which may have a substituent or a thienyl group which may have a substituent, provided that the plural $R^{34}$ may combine with each other to form a ring. $R^{34}$ is preferably a substituted phenyl group. The total carbon atom number of the substituent of the substituted phenyl group is preferably 9 to 14, and more preferably 9 to 11. The substituent is the same as those denoted in $R^{32}$.

Examples of the phosphonite compound represented by Formula (4) include dialkyl phenylphosphonites such as dimethyl phenylphosphonite and di-t-butyl phenylphosphonite; and di(phenyl derivative) phenylphosphonite such as diphenyl-phenylphosphonite, di(4-pentylphenyl)phenylphosphonite, di(2-t-butylphenyl)phenylphosphonite, di(2-methyl-3-pentylphenyl)phenylphosphonite, di(2-metyhyl-ocylphenyl) phenylphosphonite, di(3-butyl-4-methylphenyl) phenylphosphonite, di(3-hex-4-ethylphenyl) phenylphosphonite, di(2,4,6-trimethylphenyl) phenylphosphonite, di(2,3-dimethyl-4-ethylphenyl) phenylphosphonite, di(2,6-diethyl-3-butylphenyl) phenylphosphonite, di(2,3-diproyl-5-butylphenyl) phenylphosphonite, and di(2,4,6-tri-t-butylphenyl) phenylphosphonite.

Examples of the phosphonite compound represented by Formula (5) include tetrakis(2,4-di-t-butylphenyl) 4,4'-biphenylenediphosphonite, tetrakis(2,5-di-t-butylphenyl) 4,4'-biphenylenediphosphonite, tetrakis(3,5-di-t-butylphenyl) 4,4'-biphenylenediphosphonite, tetrakis(2,3,4-trimethylphenyl) 4,4'-biphenylenediphosphonite, tetrakis(2,3-dimethyl-5-ethylphenyl) 4,4'-biphenylenediphosphonite, tetrakis(2,3-dimethyl-4-propylphenyl) 4,4'-biphenylenediphosphonite, tetrakis(2,3-dimethyl-5-t-butylphenyl) 4,4'-biphenylenediphosphonite, tetrakis(2,3-dimethyl-4-t-butylphenyl) 4,4'-biphenylenediphosphonite, tetrakis(2,3-diethyl-5-methylphenyl) 4,4'-biphenylenediphosphonite, tetrakis(2,3-diethyl-4-methylphenyl) 4,4'-biphenylenediphosphonite, tetrakis(2,4,5-triethylphenyl) 4,4'-biphenylenediphosphonite, tetrakis(2,6-diethyl-4-propylphenyl) 4,4'-biphenylenediphosphonite, tetrakis(2,5-diethyl-6-butylphenyl) 4,4'-biphenylenediphosphonite, tetrakis(2,3-diethyl-5-t-butylphenyl) 4,4'-biphenylenediphosphonite, tetrakis(2,5-diethyl-6-t-butylphenyl) 4,4'-biphenylenediphosphonite, tetrakis(2,3-dipropyl-5-methylphenyl) 4,4'-biphenylenediphosphonite, tetrakis(2,6-dipropyl-4-methylphenyl) 4,4'-biphenylenediphosphonite, tetrakis(2,6-dipropyl-5-ethylphenyl) 4,4'-biphenylenediphosphonite, tetrakis(2,3-dipropyl-6-butylphenyl) 4,4'-biphenylenediphosphonite, tetrakis(2,6-dipropyl-5-butylphenyl) 4,4'-biphenylenediphosphonite, tetrakis(2,3-dibutyl-4-methylphenyl) 4,4'-biphenylenediphosphonite, tetrakis(2,5-dibutyl-3-methylphenyl) 4,4'-biphenylenediphosphonite, tetrakis(2,6-dibutyl-4-methylphenyl) 4,4'-biphenylenediphosphonite, tetrakis(2,4-di-t-butyl-3-methylphenyl) 4,4'-biphenylenediphosphonite, tetrakis(2,4-di-t-butyl-5-methylphenyl) 4,4'-biphenylenediphosphonite, tetrakis(2,4-di-t-butyl-6-methylphenyl) 4,4'-biphenylenediphosphonite, tetrakis(2,5-di-t-butyl-3-methylphenyl) 4,4'-biphenylenediphosphonite, tetrakis(2,5-di-t-butyl-4-methylphenyl) 4,4'-biphenylenediphosphonite, tetrakis(2,5-di-t-butyl-6-methylphenyl) 4,4'-biphenylenediphosphonite, tetrakis(2,6-di-t-butyl-3-methylphenyl) 4,4'-biphenylenediphosphonite, tetrakis(2,6-di-t-butyl-4-methylphenyl) 4,4'-biphenylenediphosphonite, tetrakis(2,6-di-t-butyl-5-methylphenyl) 4,4'-biphenylenediphosphonite, tetrakis(2,3-dibutyl-4-ethylphenyl) 4,4'-biphenylenediphosphonite, tetrakis(2,4-dibutyl-3-ethylphenyl) 4,4'-biphenylenediphosphonite, tetrakis(2,5-dibutyl-4-ethylphenyl) 4,4'-biphenylenediphosphonite, tetrakis(2,4-di-t-butyl-3-ethylphenyl) 4,4'-biphenylenediphosphonite, tetrakis(2,4-di-t-butyl-5-ethylphenyl) 4,4'-biphenylenediphosphonite, tetrakis(2,4-di-t-butyl-6-ethylphenyl) 4,4'-biphenylenediphosphonite, tetrakis(2,5-di-t-butyl-3-ethylphenyl) 4,4'-biphenylenediphosphonite, tetrakis(2,5-di-t-butyl-4-ethylphenyl) 4,4'-biphenylenediphosphonite, tetrakis(2,5-di-t-butyl-6-ethylphenyl) 4,4'-biphenylenediphosphonite, tetrakis(2,6-di-t-butyl-3-ethylphenyl) 4,4'-biphenylenediphosphonite, tetrakis(2,6-di-t-butyl-4-ethylphenyl) 4,4'-biphenylenediphosphonite, tetrakis(2,6-di-t-butyl-5-ethylphenyl) 4,4'-biphenylenediphosphonite, tetrakis(2,3,4-tributylphenyl) 4,4'-biphenylenediphosphonite, and tetrakis(2,4,6-tri-t-butylphenyl) 4,4'-biphenylenediphosphonite.

In the present invention, the phosphonite compound represented by Formula (5) is preferred. Among these, 4,4'-biphenylenediphosphonites such as tetrakis(2,4-di-t-butylphenyl) 4,4'-biphenylenediphosphonite are preferred, and tetrakis(2,4-di-t-butyl-5-methylphenyl) 4,4'-biphenylenediphosphonite is especially preferred.

Preferred examples of the phosphonite compounds will be shown below.

PN-1

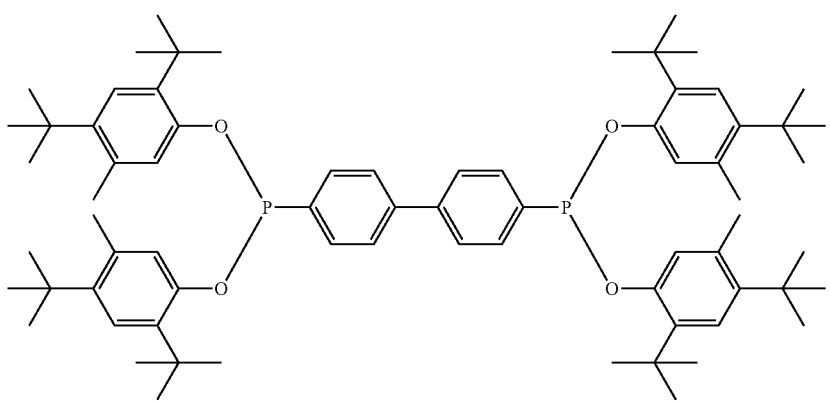

-continued
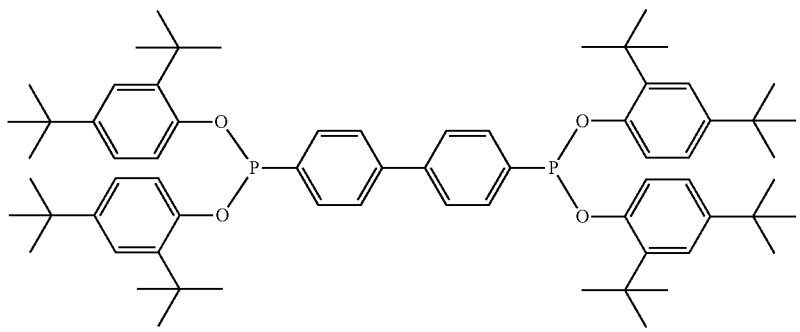
PN-2
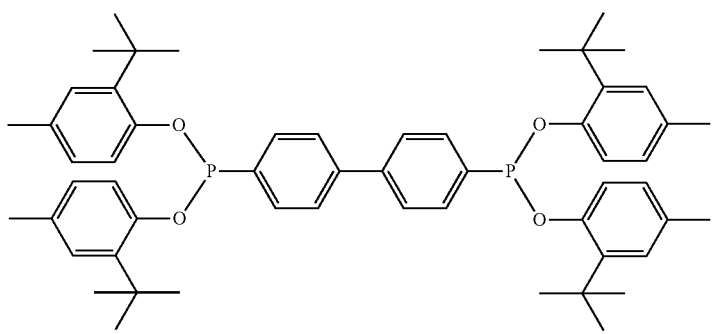
PN-3
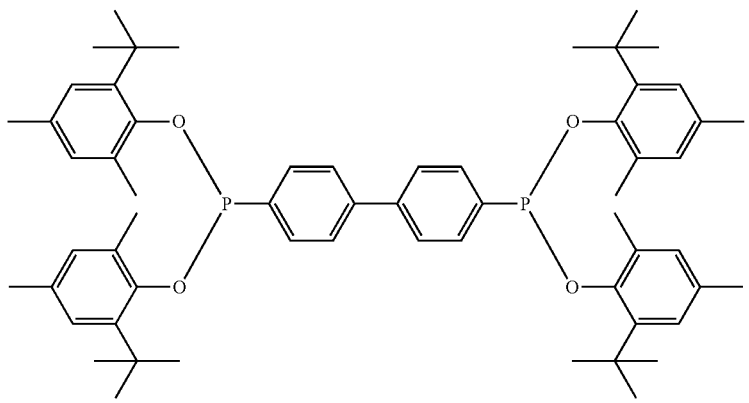
PN-4
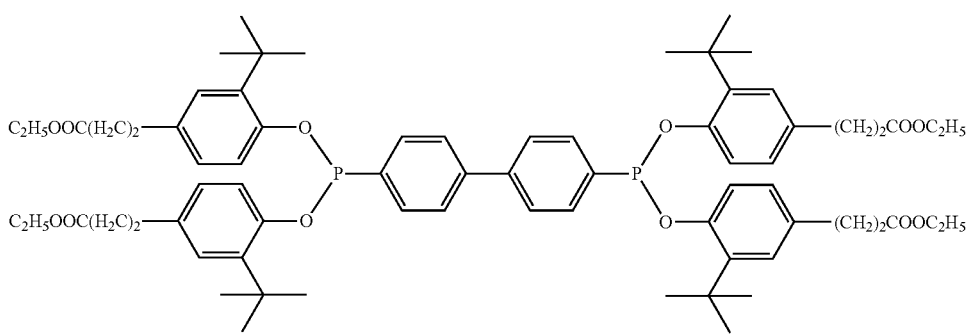
PN-5

PN-6
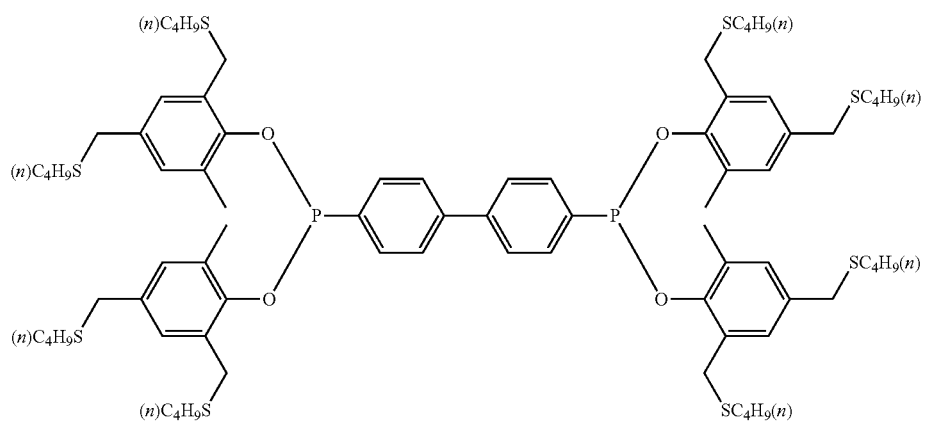
PN-7
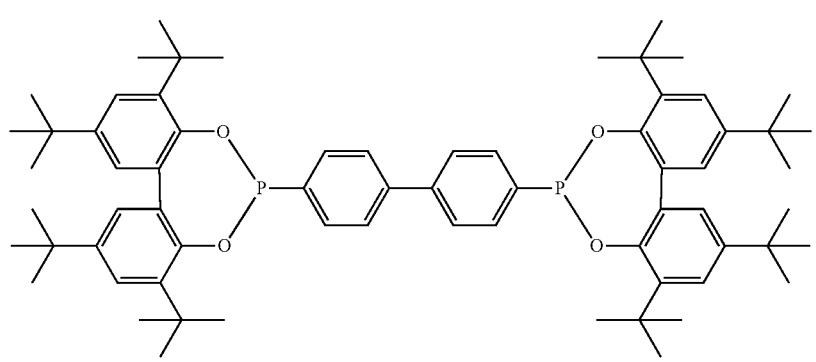
PN-8
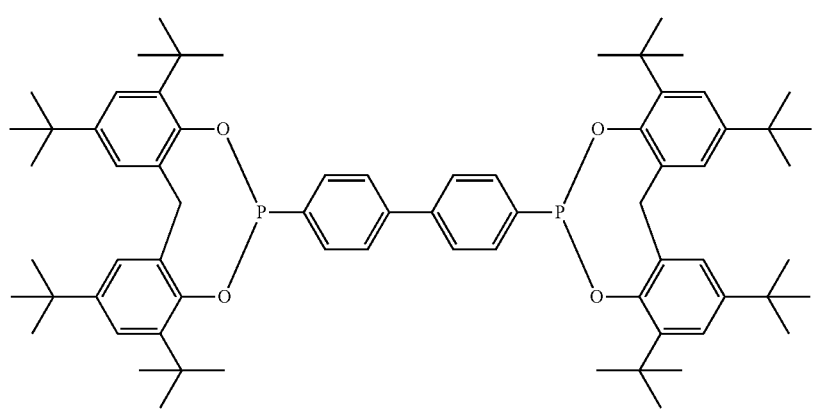
PN-9
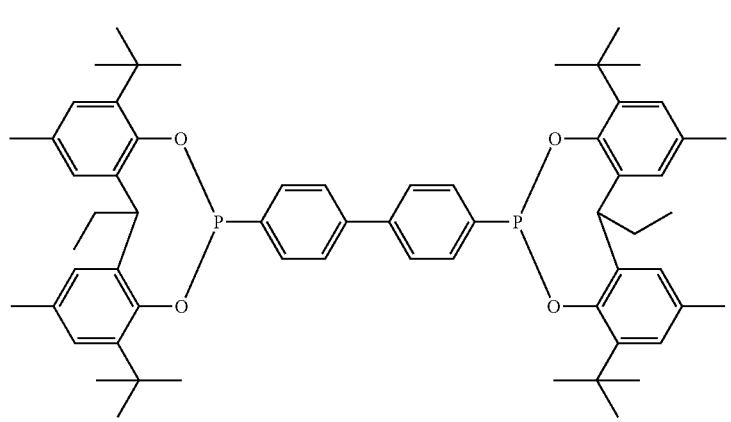

-continued
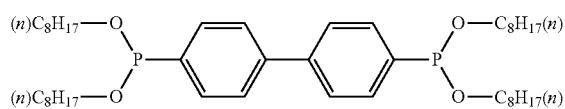
PN-10
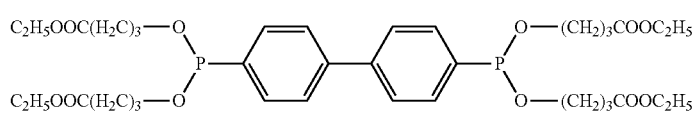
PN-11
PN-12
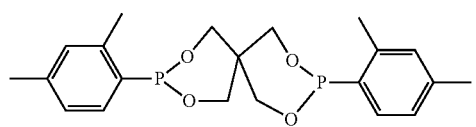
PN-13
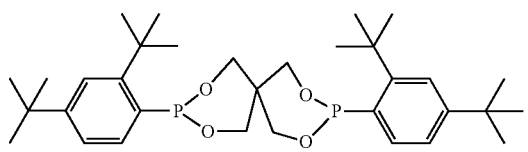
PN-14
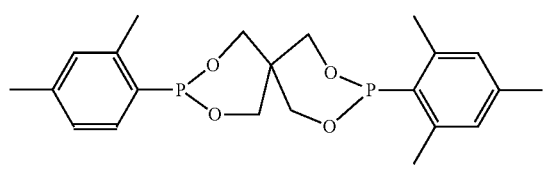
PN-15
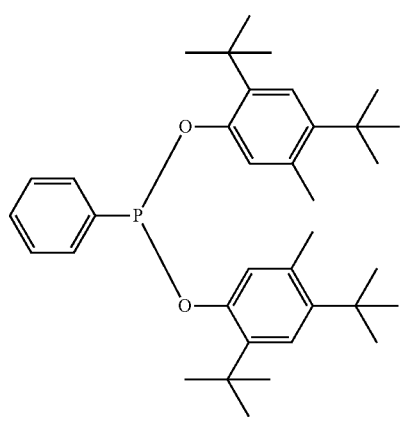
PN-16
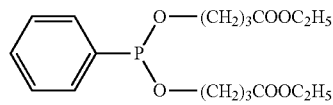
PN-17
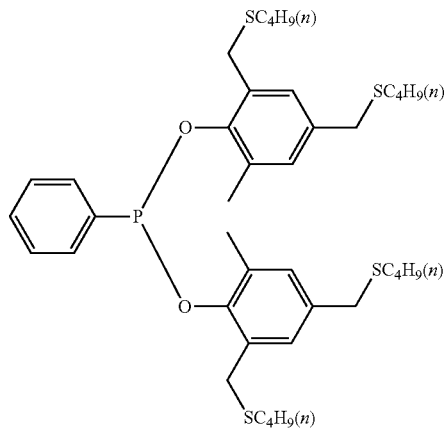
PN-18
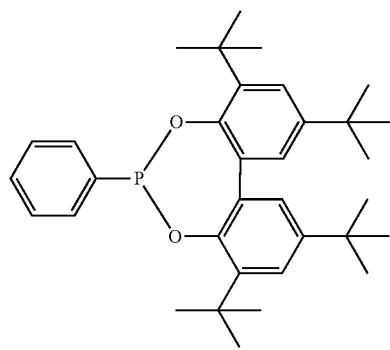
PN-19

-continued
PN-20
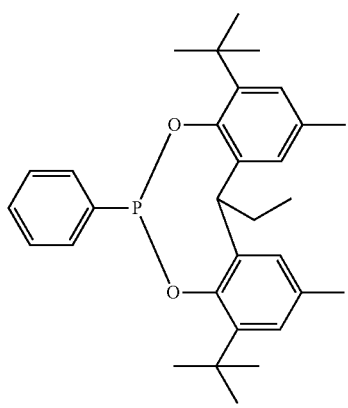
PN-21
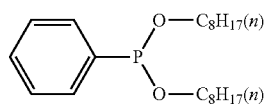
PN-22
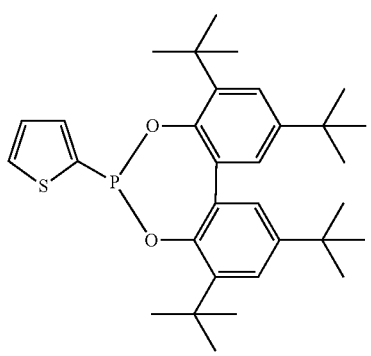
PN-23
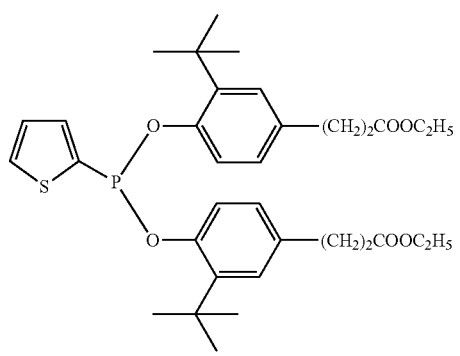
PN-24
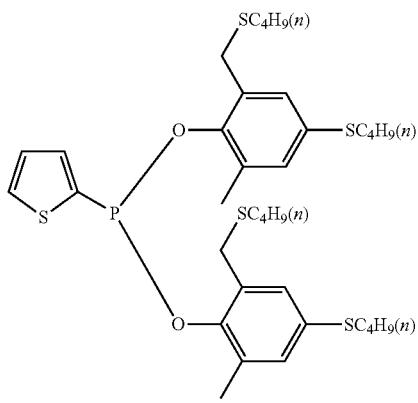
PN-25
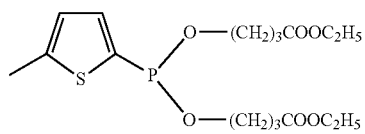
PN-26
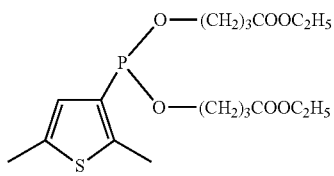
PN-27
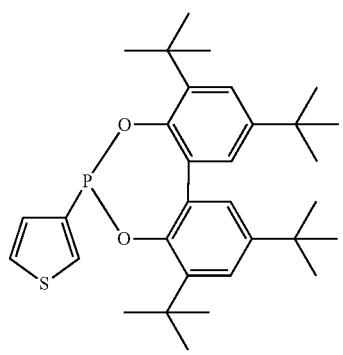
PN-28
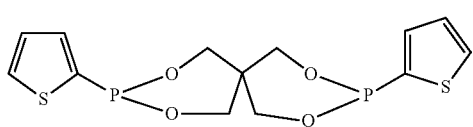

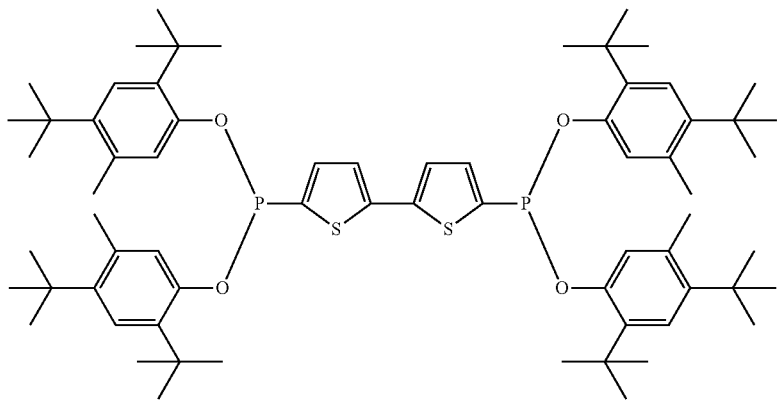

PN-29

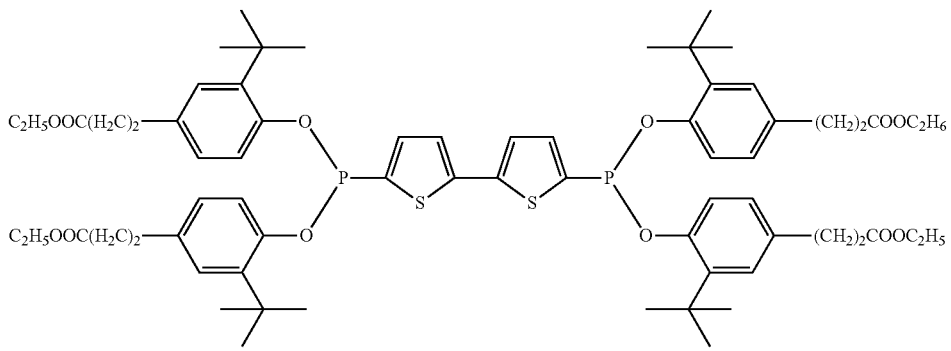

PN-30

The content of the phosphorus-containing compound in 100 parts by mass of cellulose ester is ordinarily from 0.001 to 10.0 parts by mass, preferably from 0.01 to 5.0 parts by mass, and more preferably 0.1 to 1.0 parts by mass.

As preferable compounds, "GSY-P101" from SAKAI CHEMICAL INDUSTRY CO., LTD and PEP-36 from ADEKA Corp. and SUMILIZER GP from SUMITOMO CHEMICAL Co., Ltd. are commercialized.

As phenol compounds, IRGANOX 1076 and IRGANOX 1010 from CIBA JAPAN, Inc. are commercialized.

<Retardation Controlling Agent>

In the cellulose ester film of the present invention, a compound usable for adjusting retardation may be contained.

As a compound added to control the retardation, an aromatic compound having two or more aromatic rings such as a compound disclosed in Europe patent No. 911,656A2 may be used.

Further, two or more kinds of aromatic compounds may be used in combination. As an aromatic ring of the aromatic compound, an aromatic heterocycle is included in addition to an aromatic hydrocarbon ring. An aromatic heterocycle is specifically preferable, and an aromatic heterocycle is generally an unsaturated heterocycle. Of these, a compound having a 1,3,5-triazine ring is specifically preferable.

<Colorant>

A colorant is preferably used in the present invention. The colorant means a dye or a pigment, and the colorant is ones having an effect of making the image on the liquid crystal display to bluish tone, controlling the yellow index or lowering the haze, in the present invention.

An anthraquinone dye, an azo dye and a phthalocyanine pigment are effectively usable though various dyes and pigments can be used as the colorant.

<UV Absorber>

The UV absorber used in the present invention is not specifically limited, however, cited are, for example, an oxybenzophenone compound, a benzotriazole compound, a salicylate compound, a benzophenone compound, a cyanoacrylate compound, a triazine compound, a nickel complex salt, and inorganic powder. A polymer UV absorber may also be used.

<Matting Agent>

A matting agent is preferably used to provide lubricating property to the film in the present invention.

Either of an inorganic compound or an organic compound is usable as a matting agent in the present invention as far as the transparency of the obtained film is not deteriorated or the matting agent is heat resistant in the melting process. Examples of a matting agent include talc, mica, zeolite, diatomaceous earth, calcinated diatomaceous earth, kaolin, sericite, bentonite, smectites, cray, silica, quartz powder, glass beads, glass powder, glass flake, milled fiber, warastnite, boron nitride, boron carbide, boron titanate, magnesium carbonate, heavy calcium carbonate, light calcium carbonate, calcium silicate, aluminum silicate, magnesium silicate, magnesium aluminosilicate, alumina, zinc oxide, titanium dioxide, iron oxide, magnesium oxide, zirconium oxide, aluminum hydroxide, calcium hydroxide, magnesium hydroxide, calcium sulfate, barium sulfate, silicon carbide, aluminum carbide, titanium carbide, aluminum nitride, silicon nitride, titanium nitride and white carbon. These matting agents may be utilized alone or in combination of at least two types. It is possible to highly balance transparency and a lubricating property by utilizing particles having different particle diameters and forms (for example, a needle form and a spherical form) in combination.

Among these, silicon dioxide, which is excellent in transparency (haze) due to the refractive index near to that of cellulose esterr, is preferably utilized. As specific examples of silicon dioxide, preferably utilized can be products available on the market under the name of such as Aerosil 200V, R972V, R972, R974, R812, 200, 300, R202, OX50 and TT600, Aerosil RY50, Aerosil NY50, Aerosil RY200, Aerosil RY200S, Aerosil RX50, Aerosil NA50, Aerosil RX200, Aerosil RX300, Aerosil R504, Aerosil DT4, Aerosil LE1, Aerosil LE2, (manufactured by Nippon Aerosil Co., Ltd.), Seahostar KEP-10, KEP-30 and KEP-50 (manufactured by Nippon Shokubai Co., Ltd.), Syrohobic 100 (manufactured by Fuji Silycia Chemical Ltd.), Nipseal E220A (manufactured by Nippon Silica Industry) and Admafine SO (manufactured by Admatechs). As for a form of particles, any of an irregular form, a needle form, a flat form and a spherical form can be utilized without specific limitation; however, a spherical form is specifically preferable because transparency of the prepared film becomes excellent. The size of particles is preferably not more than a wavelength of visible light and more preferably not more than ½ of a wavelength of visible light because light will be scattered when the size is near to a wavelength of visible light to make transparency poor. The particle size is specifically preferably in a range of 80-180 nm since a sliding property may not be improved when the size is excessively small. Herein, the particle size means the size of aggregate when the particles are constituted of aggregate of primary particles. Further, particle size means a diameter of an equivalent circle of the projected area when particles are not spherical.

(Viscosity Reducing Agent)

In the present invention, there may be added a hydrogen bonding solvent to reduce melt viscosity. The hydrogen bonding solvent refers to an organic solvent capable of forming a hydrogen atom-mediated "bond" caused between an electrically negative atom (e.g., oxygen, nitrogen, fluorine, chlorine) and a hydrogen atom covalent-bonded to the electrically negative atom, in other word, it means an organic solvent capable of arranging molecules approaching to each other with a large bonding moment and by containing a bond including hydrogen such as O—H ((oxygen hydrogen bond), N—H (nitrogen hydrogen bond) and F—H (fluorine hydrogen bond), as described in J. N. Israelachibiri, "Intermolecular Force and Surface Force" (translated by Tamotsu Kondou and Hiroyuki Ooshima, published by McGraw-Hill. 1991). The hydrogen bonding solvent is capable of forming a hydrogen bond between celluloses stronger than that between molecules of cellulose resin, the melting temperature of a cellulose resin composition can be lowered by the addition of the hydrogen bonding solvent than the glass transition temperature of a cellulose resin alone in the melt casting method conducted in the present invention. Further, the melt viscosity of a cellulose resin composition containing the hydrogen bonding solvent can be lowered than that of a cellulose resin in the same melting temperature.

Examples of a hydrogen bonding solvent include alcohols such as methanol, ethanol, propanol, isopropanol, n-butanol, sec-butanol, t-butanol, 2-ethyl hexanol, heptanol, octanol, nonanol, dodecanol, ethylene glycol, propylene glycol, hexylene glycol, dipropylene glycol, polyethylene glycol, polypropylene glycol, methyl cellosolve, ethyl cellosolve, butyl cellosolve, hexyl cellosolve, and glycerol; ketones such as acetone and methyl ethyl ketone; carboxylic acids such as formic acid, acetic acid, propionic acid, and butyric acid; ethers such as diethyl ether, tetrahydrofuran, and dioxane; pyrolidone such as N-methylpyrolidone; and amines such as trimethylamine and pyridine. These hydrogen bonding solvents may be used singly or in combination of two or more. Of these, alcohols, ketones, and ethers are preferred, and especially, methanol, ethanol, propanol, isopropanol, octanol, dodecanol, ethylene glycol, glycerol, acetone, and tetrahydrofuran are preferred. Further, water-soluble solvents such as methanol, ethanol, propanol, isopropanol, ethylene glycol, glycerol, acetone, and tetrahydrofuran are specifically preferred. Herein, "water-soluble" means that the solubility in 100 g of water is 10 g or more.

<Melt Casting Film>

The melt casting film formation in the present invention is defined as a method of heat melting a composition containing a cellulose ester, resin and an additive such as a plasticizer to a temperature at which the composition shows fluidity, thereafter casting the melt containing the fluid cellulose ester.

More particularly, a forming method by the heat melting can be classified into a melt extruding method, a press-forming method, an inflation method, an injection molding process, a blow molding method, and a stretching forming method. Among these methods, in order to obtain a cellulose ester film excellent in terms of mechanical strength, surface precision, etc., the melt extruding method is excellent (Film Forming Method)

Hereafter, a film forming method will be described.

(Production Process of Melt Pellet Containing Cellulose Ester and Additive)

Plural raw materials used for melt extrusion are preferably kneaded beforehand and are usually pelletized.

A well known method is employed for the pelletizing. For example, dry cellulose ester and other additives are supplied to an extruder with a feeder, kneaded by the use of a uniaxial or biaxial extruder, extruded in the shape of a strand from a die, cooled with water-cooling or air cooling, and then cut into pellets.

It is important to dry the raw materials before carrying out extrusion in order to prevent decomposition of the raw materials. Especially, since cellulose ester tends to absorb moisture easily, it is desirable to dry it at 70 to 140° C. for 3 hours or more with a dehumidification hot air dryer or a vacuum dryer such that the moisture content is made 200 ppm or less, more preferably 100 ppm or less.

Additives may be mixed before being supplied to an extruder, or may be supplied respectively by respective feeders. A small amount of additives such as an antioxidant may be preferably mixed in advance in order to mix it uniformly.

In the mixing of the antioxidant, the antioxidant may be mixed as solids to each other. Alternately, the antioxidant may be dissolved in a solvent, if necessary, and then mixed by being penetrated in cellulose ester as a solution, or by being sprayed.

A vacuum NAUTA MIXER may be preferable, because it can make drying and mixing simultaneously. Moreover, when the pellets may touch with air at the outlet of a feeder section and a die, it is desirable to make the outlet under atmosphere such as dehumidified air and dehumidified $N_2$ gas. Moreover, it is desirable to keep a feed hopper to an extruder warm, because it can prevent moisture absorption.

A matting agent UV absorbent, etc. may be sprinkled on the obtained pellets, or may be added in an extruder at the time of forming a film.

It is preferable to suppress the shearing power of an extruder and to process at a temperature capable of pelletizing as low as possible in order to avoid the deterioration of resin (the decrease of a molecular weight, coloring, gel formation, etc.). For example, in the case of a biaxial extruder, it is preferable to rotate them in the same direction by the use of a deep groove type screw. In the viewpoint of the homogeneity in kneading, an engagement type is preferable.

Although a kneader disk can improve a kneading ability, cautions are needed for heat generation caused by shearing. The kneading ability may be sufficient even if the kneader disk is not used. Suctioning may be conducted from a vent hole if needed. As long as it is low temperature, since it hardly generates a volatile component, no vent hole may be provided.

With regard to the color of a pellet, b* value being an index of yellow is preferably in the range of −5 to 10, more preferably −1 to 8, and still more preferably −1 to 5. The b* value can be measured by the use of a spectrocalorimetry meter CM-3700d (manufactured by Konica Minolta Sensing Inc.) with a light source of D65 (color temperature: 6504K) at a view angle of 10°.

The film formation is performed by use of the pellets obtained as above. Of course, it is also possible not to pelletize, but to supply the powder of a raw material as it is to an extruder with a feeder, and to carry out a film formation by using it.

(Extrusion Process of the Melt of Cellulose Ester and Additive from a Die)

Polymer having been dried by a dehumidified hot wind or under vacuum or reduced pressure is melt at an extrusion temperature of 200-300° C. by use of a uniaxial or biaxial type extruder, and after foreign matters having been eliminated by filtering through such as a leaf disc type filter, the melt polymer is cast in a film through a T die to be solidified on a cooling drum.

Introduction into extruder from a supply hopper is preferably performed under vacuum, or under a reduced pressure or inert gas atmosphere to prevent such as oxidative decomposition of the polymer.

It is preferable to stably control the extrusion flow rate by utilizing such as a gear pump. Further, as a filter utilized for elimination of foreign matters, a stainless fiber sintered filter is preferably utilized.

A stainless fiber sintered filter is comprised of a stainless fiber assembly having been made into a complex coiled state and compressed to sinter the contacting points resulting in one body, and the filtering precision is adjustable by varying a density depending on the fiber thickness and the compression amount.

One in which coarse and dense filtering precisions are repeated plural times to make a multi-layered body is preferable. Further, it is preferable to make a filter having a composition of gradually increasing filtering precision or of repeating coarse and dense filtering precisions since a filter life is prolonged as well as capturing efficiency of foreign matters and gel is improved.

There is a case to generate a defect of a streak form when a flaw or a foreign matter is adhered on a die. Such a defect is also called as a die line, and it is preferable to make a structure having a stagnant portion of resin as small as possible to minimize surface defects such as a die line. It is preferable to use a die having as minimum flaws as possible in the interior and on a lip of a die.

The inside surface of an extruder or a die which contacts with melt resin is preferably subjected to a surface treatment to be made barely adhere melt resin by decreasing the surface roughness or by utilizing a material having a low surface energy. Specifically, listed are those having been subjected to hard chromium plating or ceramic melt spattering are ground to make a surface roughness of not more than 0.2 S.

An additive such as a plasticizer may be mixed with resin in advance or may be kneading mixed in the way of an extruder. It is preferable to utilize a mixing device such as a static mixer for homogeneous addition.

(Casting Process of Melt Extruded from the Die while Pressing Between Cooling Roll and Elastic Touch Roll)

The temperature of the film on the touch roll side when the film is nipped between a cooling roll and an elastic touch roll is preferably not less than the Tg of the film, but not more than Tg+110° C. A well-known roll may be used as a roll having an elastic surface to be used for such a purpose.

A touch roll is also referred to as a pressure rotary member. As a touch roll, those disclosed in, for example, Japanese Patent Nos. 3194904 and 3422798, and JP-A Nos. 2002-36332 and 2002-36333. As the touch roll, those commercially available may also be used.

When the film is peeled from the cooling roll, the tension is preferably controlled in order to prevent transformation of the film.

(Stretching Process)

In the present invention, after the film obtained as aforementioned is passed through the process in which the film is in contact with the cooling roll, the film is stretched in the film transport direction preferably at a stretching rate represented by following Equation (1) in the range of 1000%/min-30000%/min, in order to control the sound velocity of the film at a desired value.

The duration required to stretch the film was calculated from the length of the stretching process and the film transport speed, and the dimension after stretched was determined by making a mark at a prescribed length on the film before stretching, followed by measuring the length after stretched.

$$\text{stretching rate}(\%/\text{min}) = ((\text{a dimension after stretching})/(\text{a dimension before stretching}) - 1) \times 100 \, (\%)/\text{a time needed for stretching}(\text{Min}). \quad \text{Equation (1)}$$

Further, it is preferable that the aforementioned film is stretched in the lateral direction of the film at a stretching rate represented by above Equation (1) in the range of 400%/min-1500%/min, and that the aforementioned film is stretched at 50%-200% in at least one of the film transport direction and the lateral direction.

When the stretching rate is too small, it is difficult to obtain a cellulose ester film having a preferable sound velocity, and, when the stretching rate is too large, the film may be ruptured or the film may become slack due to the weight of itself.

As the method of stretching a well-known roll stretcher or a tenter may be preferably employed.

It is preferable that the stretching is carried out in the temperature range of Tg–Tg+60° C., Tg being Tg of the resin constituting the film.

The glass transition temperature Tg of the film constituting material can be controlled by making the types of the materials constituting the film and the proportion of the constituent materials different. When an optical film is manufactured, it is preferable that Tg is 110° C. or more, and more preferably 125° C. or more. In a liquid crystal display, in an image displaying state, the temperature environment of the film is changed due to the temperature increase of the apparatus itself, for example, due to the temperature increase caused by a light source. In this case, when the Tg of the film is lower than the temperature in the working environment, a big change may occur in the retardation value which is determined by the orientation of the molecules in the film, the orientation of the molecules being fixed by stretching, or in the film dimension. If the Tg of the film is too high, temperature is raised when the film constituting material is formed into a film. This will increase the amount of energy consumed for heating. Further, the material may be decomposed at the time of forming a film, and this may cause coloring. Thus, Tg is preferably 250° C. or less.

In the stretching process, a well-known thermal fixing condition, cooling and relaxation may be applied. Appropriate adjustment may be made to obtain the characteristics needed for the desired optical film.

When the stretching temperature is too low, rupture of the film may occur, and, when the stretching temperature is too high, desired retardation may not be obtained.

The stretching is preferably carried out under a controlled homogeneous temperature distribution. The temperature distribution is preferably within ±2° C., more preferably within ±1° C., and specifically preferably within ±0.5° C.

Before winding up the film, the edge portions are cut down by slitting to make the width of a product and a knurling process (an embossing process) may be applied on the both edges of the film to prevent adhesion or abrasion marks while winding. To provide knurling, a metal ring, on the side surface of which is provided with a roughness pattern, is heated and pressed on the film. Herein, since the clipped portion at the both edge portions of the film is not usable as a product because of deformation of the film, it is cut out to be reused as a starting material.

Hereafter, the stretching method will be explained.

As stretching, stretching in the film transport direction (stretching in the longitudinal direction), stretching in the width direction (stretching in the lateral direction) or combination thereof is carried out. The longitudinal stretching can be carried out by roll stretching (stretching in the longitudinal direction employing two or more pairs of nip rolls of which the roll on the outlet side has a higher peripheral speed) or fixed end stretching (which gradually increase a transporting speed in the transport direction, while holding both ends of the film). The stretching in the lateral direction can be carried out by tenter stretching (stretching the film in the lateral direction (in the direction perpendicular to the longitudinal direction) while holding both ends of the film by chucks).

The stretching in the longitudinal direction and the stretching in the lateral direction may be carried out alone (uniaxial stretching), respectively, or may be caned out in combination (biaxial stretching). When the biaxial stretching is carried out, the stretching in the longitudinal direction and the stretching in the lateral direction may be carried out successively (successive stretching) or simultaneously (simultaneous stretching).

The stretching rate in the in the film transport direction is preferably from 1000%/min to 30000%/min, more preferably from 5000%/min to 20000%/min, and still more preferably from 10000%/min to 20000%/min. When a multistep stretching is carried out, the stretching rate implies an average of the stretching rate at each stage.

Further, it is preferable that the aforementioned film is stretched in the lateral direction at a stretching rate represented by above Equation (1) from 400%/min to 1500%/min, more preferably from 500%/min to 1400%/min and still more preferably from 600%/min to 1300%/min.

Subsequently to the above stretching, it is preferable that the film is relaxed in the longitudinal direction or in the lateral direction by 0 to 10%. Further, it is also preferable that the stretching is followed by heat fixing at 150 to 250° C. for 1 second to 3 minutes.

In the optical film according to the present invention, the needed sound velocity range, and the retardation Ro and Rth can be controlled by stretching 50%-200% in the at least 1 direction. Here, Ro refers to an in-plane retardation, representing a value obtained by multiplying the remainder between the refractive index in the longitudinal direction MD and the refractive index in the lateral direction TD by the thickness of the film, and Rth refers to a retardation in the thickness direction, representing a value obtained by multiplying the remainder between the in-plane refractive index (an average of the refractive index in the longitudinal direction MD and the refractive index in the lateral direction TD) and the refractive index in the thickness direction by the thickness of the film.

The film can be, for example, successively or simultaneously stretched in the film transport direction and in the lateral direction. In this case, too small stretching ratio in at least one direction provides insufficient optical retardation, while too large stretching ratio results in rupture of the film.

Stretching in the directions of two axes perpendicular to each other is an effective method to allow film refractive indexes nx, ny and nz to fall within a predetermined range. Herein, nx is a refractive index in the film transport direction (MD), ny is a refractive index in the lateral direction (TD), and nz is a refractive index in the thickness direction.

For example, when film is stretched in the film transport direction, too much contraction in the lateral direction of the film provides too large nz value. In this case, improvement can be carried out by restraining the contraction in the lateral direction of the film or by stretching the film in the lateral direction. When the film is stretched in the lateral direction, diversion of refractive index may be produced in the lateral direction. This phenomenon is sometimes found in a tenter method, and is considered to be due to so-called bowing phenomenon, which is caused by the fact that the film center shrinks and the film edges are fixed. In this case also, the bowing phenomenon can be avoided by stretching the film in the film transport direction, whereby diversion of refractive index in the lateral direction can be minimized.

Further, stretching in the two directions crossing at right angles each other can minimize variation of film thickness. Too much variation of film thickness causes unevenness of the optical retardation, resulting in color unevenness of images of a liquid crystal display.

The variation of thickness of the cellulose ester film of the present invention is preferably in the range of ±3%, and more preferably in the range of ±1%.

After stretching, the end of the film is trimmed off by a slitter to a width predetermined for the product. Then both ends of the film are knurled by a knurling apparatus composed of an emboss ring and a back roll, and the film is wound by a winder. This arrangement prevents sticking or scratching in the cellulose ester film (master winding). Knurling can be carried out by pressing on the film a metallic ring having a roughness pattern on the side surface under application of heat and pressure. The both ends of the film, portions gripped by the clips, are normally deformed and cannot be used as a film product. They are therefore cut out and are recycled as a material.

It is generally known that, in the melt extrusion method, the residence time of edge side tends to be longer due to the shape of a casting die. Accordingly, it is assumed that the coloration at the edge portion was promoted. In the present invention, yellow index of an edge portion in the lateral direction of the film just after melt extruded Ye and yellow index of a central portion of the film Yc preferably meet the following condition. The Ye/Yc value is more preferably 3.0 or less. If the Ye/Yc value is larger than 5.0, the coloration of a film increases, when cut portion at the edge of the film is recycled to be used as a raw material of the film production. In the present invention, the yellow index of an edge portion in the lateral direction of the film Ye is defined to be the maximum yellow index value measured within 30 mm from the both edges in the lateral direction of the film.

$1.0 \leq Ye/Yc \leq 5.0$           Condition

In the case of an optical film, the thickness of the film is preferably 10 to 500 μm. In particular, the lower limit is 20 μm or more, and preferably 30 μm or more. The upper limit is 150 μm or less, and preferably 120 μm or less. The particularly preferred range is 25 to 90 μm. If the film is too thick, the polarizing plate after processed becomes too thick. This fails to meet the purpose for thin-shape and lightweight when employed in the liquid crystal display for a notebook PC or mobile type electronic equipment. Conversely, if the film is too thin, the moisture permeability of the film is increased, whereby the ability to protect the polarizer from moisture tends to become lower.

When manufacturing the cellulose ester film according to the present invention, a functional layer such as a transparent conductive layer, a hard coat layer, an antireflection layer, a lubricant layer, an adhesive layer, an antiglare layer, a barrier layer and an optical compensation layer may be coated before and/or after stretching. Specifically, it is preferable that at least one selected from the group consisting of a transparent conductive layer, a hard coat layer, an antireflection layer, an adhesive layer, an antiglare layer, and an optical compensation layer is provided. In this case, various forms of surface treatment such as corona discharging, plasma processing, medical fluid treatment can be provided wherever required.

(Polarization Plate)

The polarizing plate according to the present invention will be explained.

The polarizing plate can be prepared by a common method. It is preferable that the cellulose ester film of the present invention is saponified by alkaline treatment on the backside thereof and the treated film is laminated, through a completely saponified poly(vinyl alcohol), on at least one side of a polarizer, which has been prepared by immersing in an iodine solution and stretching. On the other side of the polarizer, the cellulose ester film of the present invention or another polarizing plate protective film may be either used. As an optical film or a polarizing plate protective film to be used on the side of the polarizer opposite to the cellulose ester film of the present invention used, cellulose ester films available on the market can be used. Preferred examples thereof include KC8UX, KC4UX, KC5UX, KC8UCR3, KC8UCR4, KC8UCR5, KC8UY, KC4UY, KC10UDR, KC4FR, KC4UE, KC8UE, KC8UY-HA, KC8UX-RHA, KC8UXW-RHA-C, KC8UXW-RHA-NC and KC4UXW-RHA-NC, each produced by Konica Minolta Opto, Inc. A optical film serving also as an optical compensation film which has an optical anisotropic layer formed by orientating a liquid crystal compound such as a discotic liquid crystal, a rod-shaped liquid crystal or a cholesteric liquid crystal is also preferably used. For example, an optical anisotropic layer can be formed by the method described in JP-A No. 2003-98348. A polarizing plate having excellent flatness and a wide viewing angle can be obtained by a combined use of such an optical compensation film with the cellulose ester film of the present invention.

The polarizing film, a major component of the polarizing plate, is an element through which light polarized in a certain direction only passes. Presently known typical polarizing film is a poly(vinyl alcohol) type polarizing film which includes a poly(vinyl alcohol) type film dyed by iodine and that dyed by a dichromatic dye. As the polarizing film, one prepared by forming a film from an aqueous solution of poly(vinyl alcohol) and mono-axially stretching and dying the film or one prepared by mono-axially stretching after dying and then treating by a boron compound for giving durability is used. The polarizing film is adhered onto one side of the cellulose ester film of the present invention to prepare the polarizing plate. The adherence is preferably carried out through an aqueous adhesive mainly composed of completely saponified poly(vinyl alcohol).

Since the long-length cellulose ester film produced via the melt casting film forming method according to the present invention can be adhered with a long-length polarizer (polarizing film) after the polarizer is subjected to an alkali saponification treatment, an excellent effect with respect to the productivity can be obtained, when the film length is 100 m or more. When the film becomes further longer, such as 1500 m, 2500 m and 5000 m, the productivity effect of the production of a polarizing plate also becomes higher.

Also, since the polarizing plate employing the cellulose ester film of the present invention is excellent in reworkability, an effect of higher production yield can be obtained.

(Liquid Crystal Display)

The polarizing plate having the cellulose ester film of the present invention provides a higher display quality when compared with a commonly used polarizing plate.

The polarizing plate according to the present invention is usable, for such as MVA (Multi-domain Vertical Alignment) mode, PVA (Patterned Vertical Alignment) mode, CPA (Continuous Pinwheel Alignment) mode, OCB (Optical Compensated Bend) mode and IPS (In-Plane Switching) mode.

Liquid crystal displays are now being applied for a color display or moving picture display. The polarizing plate improved in display quality, contrast and durability according to the present invention enables an accurate display of moving pictures without causing eye fatigue.

EXAMPLES

The present invention will be specifically explained using examples, however, the present invention is not limited thereto.

Example 1

With a vacuum-Nautar mixer, 100 parts by mass of cellulose acetate propionate already dried at 80° C. for 6 hours (moisture content 200 ppm) and having an acetyl group substitution degree of 1.40, a propionyl group substitution degree of 1.30, a total acyl group substitution degree of 2.70 and a number average molecular weight of 60000, 8 parts by mass of plasticizer No. 64 of Formula (1), 1.5 parts by mass of TINUVIN 928 (produced by CIBA JAPAN K. K.), 0.25 part by mass of GSY-P101 (produced by SAKAI CHEMICAL INDUSTRY CO., LTD.), 0.5 part by mass of IRGANOX 1010 (produced by CIBA JAPAN K. K.), 0.2 part by mass of SUMILIZER GS (SUMITOMO CHEMICAL Co., Ltd.) and 0.1 part by mass of SEAHOSTAR KEP-30 (produced by NIPPON SHOKUBAI Co., Ltd.) were further dried at 80° C. under 1 Torr for 3 hours while being mixed.

The obtained mixture was melted and mixed at 235° C. by a bi-axial type extruder and was pelletized.

The film formation of the cellulose ester film was carried out using a production apparatus shown in FIG. 1.

Using a single screw extruder, the pellets (moisture regain: 50 ppm) was melt-extruded in the form of a film at a melting temperature of 240° C. through the T-die onto the first cooling roll having a surface temperature of 90° C., whereby a cast film having a thickness of 135 μm was produced. Further, on the first cooling roll, an elastic touch roll having a 2 mm-thick metal surface was pressed against the film.

The obtained film was stretched 70% in the film transport direction at 190° C. using a stretching apparatus utilizing a difference in peripheral speeds of the rolls to obtain cellulose ester film 1 having a thickness of 80 μm.

Inventive and comparative cellulose ester films 2-14 and 19-22 each having a thickness of 80 μm were obtained in the same manner as described for cellulose ester film 1 of the present invention, except that the stretching rate, stretching ratio and initial film thickness were changed as shown in FIG. 1.

In order to stretch the film in the lateral direction, the film having been stretched in the film transport direction was introduced into a tenter having a preheating zone, stretching zone, retaining zone, and cooling zone (neutral zones were also provided to ensure heat insulation between the zones). Then, the film was stretched in the lateral direction at 165° C. and cooled to 30° C. After that, the film was released from the clips and the clipped portions were trimmed off, thus a film was obtained.

<Preparation of Cellulose Ester 15>

In order to obtain a particle dispersion liquid, 11 parts by mass of SEAHOSTAR KEP-30 (produced by NIPPON SHOKUBAI Co., Ltd.) and 89 parts by mass or more of ethanol were mixed while stirring for 50 minutes in a dissolver and dispersed using a Manton-Gaulin homogenizer.

In a dissolution tank containing 99 parts by mass of methylene chloride, 4 parts by mass of cellulose acetate propionate having an acetyl group substitution degree of 1.40 and a propionyl group substitution degree of 1.30 was added, followed by complete dissolution via heating. The resulting mixture was filtered via AZUMI FILTER No. 244 produced by Azumi Filterpaper Co., Ltd. While vigorously stirring the cellulose ester solution after filtration, 11 parts by mass of the particle dispersion liquid was gradually added. Further, dispersion was carried out via an attritor and the resulting dispersion was filtered via FINE MET NF, produced by Nippon Seisen Co., Ltd., whereby a particle additive liquid was prepared.

A primary dope liquid having the following composition was prepared. Initially, into a pressurized dissolving tank methylene chloride and ethanol were added. While stirring, cellulose ester was fed into the pressurized dissolving tank incorporating solvents. The resulting mixture was heated while stirring to realize complete dissolution. Further, plasticizers was added and dissolved. The resulting mixture was filtered via AZUMI FILTER No. 244, produced by Azumi Filterpaper Co., Ltd., whereby a primary dope liquid was prepared.

A mixture of 100 parts by mass of the primary dope liquid and 2 parts by mass of particle additive liquid was prepared. The resulting mixture was vigorously blended via an in-line mixer (Toray static type in-line mixer HI-MIXER, SWJ). Subsequently, the above blend was uniformly cast onto a 2 m wide stainless steel band employing a belt casting apparatus. On the stainless steel band support, solvents were evaporated to a residual solvent amount of 110%, followed by peeling from the stainless steel band. At the time of peeling, the film was stretched 50% in the film transport direction at a stretching rate of 15000%/min at 190° C. by applying a tension.

<Primary Dope Liquid Composition>

| | |
|---|---|
| Methylene chloride | 300 parts by mass |
| Ethanol | 52 parts by mass |
| Cellulose ester (an acetyl group substitution degree of 1.40, a propionyl group substitution degree of 1.30, and a total acyl group substitution degree of 2.70) | 100 parts by mass |
| Plasticizer No. 64 represented by Formula (1) | 8 parts by mass |
| TINUVIN 900 (produced by CIBA JAPAN K.K.) | 1.2 parts by mass |

Cellulose ester films 16-18 were prepared in the same manner as described for cellulose ester film 15, except that the stretching rate, stretching ratio, and initial film thickness were changed as shown in Table 1. The film having been stretched in the film transport direction was stretched in the lateral direction at 165° C., while the both edges of the web were held in tenter 12.

These cellulose ester films 1-22 were subjected to the evaluation with respect to the sound velocity, amount of plasticizer, color unevenness and light leakage. Obtained results were summarized in Table 1.

<Sound Velocity>

The sound velocities of the cellulose ester films of the present invention were determined by leaving the film in the same circumstance of 23° C. and 55% RH for 24 hours and using SONIC SHEET TESTER (Type: SST-110, supplied by NOMURA SHOJI Co., Ltd.).

<Amount of Plasticizer>

The amount of the plasticizer on the surface of the film was determined by: collecting a 20 nm portion from A surface or from B surface of the film using a knife; measuring the weight of the portion; dissolving the portion in acetone; and determining the amount of plasticizer in the solution employing GC (gas chromatography). The "Plasticizer content ratio", namely, "(a content of a plasticizer on A surface)/(a content of a plasticizer on B surface)" of each cellulose ester film was shown in Table 1.

<Color Unevenness>

The cellulose ester film of the present invention was interposed between two polarizing plates arranged in an orthogonal state (being a cross-nicol state), and a light source was placed on the out side of one of the polarizing plates to illuminate the polarizing plate and visual observation was made from the outside of the other polarizing plate. The ranking of color unevenness was conducted according to the following criteria.

A: No light transmission was observed and the whole plate was uniformly dark.

B: Streaks of bright-dark portions were partially observed.

C: Streaks of very bright-dark portions were partially observed.

<Preparation of Polarizing Plate and Liquid Crystal Display>

(Preparation of Polarizing Plate)

The following alkali saponification treatment and preparation of polarizing plate were performed using the mother roll specimen of cellulose ester films 1-16 and 19-22 prepared as described above.

<Alkali Saponification Treatment>

| | | | |
|---|---|---|---|
| Saponification process | 2M-NaOH | 50° C. | 90 seconds |
| Washing process | Water | 30° C. | 45 seconds |
| neutralizing process | 10 mass % HCl | 30° C. | 45 seconds |
| Washing process | Water | 30° C. | 45 seconds |

After the saponification treatment, washing, neutralizing and washing were carried out in this order, and then the film was dried at 80° C.

<Preparation of Polarizer>

A 120 μm thick polyvinyl alcohol film of a long-length roll was immersed in 100 parts by mass of an aqueous solution incorporating 1 part by mass of iodine and 4 parts by mass of boric acid and was stretched at 50° C. by a factor of 6 in the film transport direction, whereby a polarizer was prepared.

A KC4FR film produced by KONICA MINOLTA OPTO, Inc. saponified in the same manner as above on one surface of the above polarizer, and aforementioned alkali-saponified cellulose ester film of the present invention on the other surface of the polarizer were adhered employing a 5% aqueous solution of fully saponified polyvinyl alcohol as an adhesive, so that the transmission axis of the polarizer and the in-plane slow axis of each film were laid parallel. The products were dried to obtain polarizing plates 1-16 and 19-22.

(Preparation of Liquid Crystal Display)

The originally provided polarizing plate of a 15-sized VA mode liquid crystal display VL-1530S produced by FUJITSU was carefully removed and the obtained polarizing plate was adhered through an adhesive layer, so that the transmission axis laid in the same direction as that of the originally provided polarizing plate, whereby a liquid crystal display was obtained. Then, the backlight was continuously turned on for 5 hours under a circumstance of 23° C. and 55% RH and the black display state of the liquid crystal display was visually observed in a dark room to evaluate light leakage.

The results were shown in Table 1.

<Light Leakage>

Light leakage under the black display state was visually evaluated according to the following criteria.
  A: No light leakage was observed.
  B: Slight light leakage was observed at 1-2 portions.
  C: Strong light leakage was observed at 1-2 portions.
  D: Strong light leakage was observed at 3 or more portions.

Light leakage ranked as B or higher is practically acceptable.

It is clear that the cellulose ester film having the sound velocity of the present invention is improved in color unevenness and in light leakage when compared to comparative samples.

Example 2

Inventive cellulose ester films having a film thickness of 80 μm were obtained in the same manner as described for cellulose ester film 13 except that GSY-P101 was changed as shown in Table 2.

Using cellulose ester films 13 and 23-25, coloration of the film was evaluated. The results of the evaluation were shown in Table 2.

(Coloration)

The cellulose ester films of the present invention were visually evaluated while the films were irradiated with transmitting light to rank the coloration of the film according to the following criteria.
  ○: The film was transparent and colorless.
  ○Δ: The film was very slightly colored.
  Δ: The film was slightly colored.
  x: Coloration of the film was recognized at a glance.

TABLE 2

| Cellulose ester film No. | Antioxidant 1 | Coloring | Remarks |
|---|---|---|---|
| 13 | GSY-P101 | ○ | Inventive |
| 23 | SumilizerGP | ○ | Inventive |
| 24 | LA-52 | ○Δ | Inventive |
| 25 | — | Δ | Inventive |

TABLE 1

| Cellulose ester film No. | Film forming method | Plasticizer content ratio | Initial film thickness (μm) | Stretching rate Film transport direction (%/min) | Stretching rate Lateral direction (%/min) | Stretching ratio Film transport direction (%) | Stretching ratio Lateral direction (%) | Sound velocity Film transport direction (km/s) | Sound velocity Lateral direction (km/s) | Color unevenness | Light leakage | Remarks |
|---|---|---|---|---|---|---|---|---|---|---|---|---|
| 1 | melt | 1.0 | 135 | 1000 | — | 70 | 0 | 2.02 | 1.82 | A | B | Inv. |
| 2 | melt | 1.0 | 135 | 15000 | — | 70 | 0 | 2.13 | 1.82 | A | A | Inv. |
| 3 | melt | 1.0 | 135 | 30000 | — | 70 | 0 | 2.16 | 1.82 | A | B | Inv. |
| 4 | melt | 1.0 | 220 | 1000 | — | 180 | 0 | 2.59 | 1.82 | A | B | Inv. |
| 5 | melt | 1.0 | 220 | 15000 | — | 180 | 0 | 2.67 | 1.82 | A | A | Inv. |
| 6 | melt | 1.0 | 220 | 30000 | — | 180 | 0 | 2.70 | 1.82 | A | B | Inv. |
| 7 | melt | 1.0 | 135 | — | 400 | 0 | 70 | 1.86 | 2.04 | A | B | Inv. |
| 8 | melt | 1.0 | 135 | — | 1000 | 0 | 70 | 1.86 | 2.05 | A | A | Inv. |
| 9 | melt | 1.0 | 135 | — | 1500 | 0 | 70 | 1.86 | 2.06 | A | B | Inv. |
| 10 | melt | 1.0 | 220 | — | 400 | 0 | 180 | 1.86 | 2.66 | A | B | Inv. |
| 11 | melt | 1.0 | 220 | — | 1000 | 0 | 180 | 1.86 | 2.67 | A | A | Inv. |
| 12 | melt | 1.0 | 220 | — | 1500 | 0 | 180 | 1.86 | 2.67 | A | B | Inv. |
| 13 | melt | 1.0 | 180 | 18000 | 700 | 60 | 70 | 2.09 | 2.05 | A | A | Inv. |
| 14 | melt | 1.0 | 240 | 15000 | 1000 | 100 | 100 | 2.13 | 2.25 | A | A | Inv. |
| 15 | solution | 1.5 | 135 | 15000 | — | 50 | 0 | 2.71 | 2.02 | C | C | Comp. |
| 16 | solution | 1.5 | 135 | — | 500 | 0 | 50 | 2.02 | 2.48 | C | C | Comp. |
| 17 | solution | 1.5 | 160 | 15000 | — | 100 | 0 | rupture | rupture | rupture | rupture | Comp. |
| 18 | solution | 1.5 | 160 | — | 1000 | 0 | 100 | rupture | rupture | rupture | rupture | Comp. |
| 19 | melt | 1.0 | 135 | 500 | — | 70 | 0 | 1.95 | 1.82 | B | D | Comp. |
| 20 | melt | 1.0 | 135 | — | 100 | 0 | 70 | 1.86 | 1.96 | B | D | Comp. |
| 21 | melt | 1.0 | 240 | 40000 | — | 180 | 0 | 2.83 | 1.82 | B | D | Comp. |
| 22 | melt | 1.0 | 240 | — | 3000 | 0 | 180 | 1.86 | 2.75 | B | D | Comp. | melt: melt casting film forming method, solution: solution casting film forming method
Inv.: Inventive, Comp.: Comparative It is under stood that the addition of an antioxidant having a phosphonite structure or a phosphite structure improves the coloration.

Example 3

Inventive cellulose ester films having a film thickness of 80 μm were obtained in the same manner as described for cellulose ester film 13 except that the total acyl group substitution degree and the propionyl group substitution degree were changed as shown in Table 3.

Using cellulose ester films 13 and 26-33, reworking properties of the films were evaluated. The results of the evaluation were shown in Table 3.

<Preparation of Polarizing Plate and Liquid Crystal Display>
(Preparation of Polarizing Plate)

The following alkali saponification treatment and preparation of polarizing plate were performed using the mother roll specimen of cellulose ester films 13 and 26-33 prepared as described above.

<Alkali Saponification Treatment>

| Saponification process | 2M-NaOH | 50° C. | 90 seconds |
| Washing process | Water | 30° C. | 45 seconds |
| Neutralizing process | 10 mass % HCl | 30° C. | 45 seconds |
| Washing process | Water | 30° C. | 45 seconds |

After the saponification treatment, washing, neutralizing and washing were carried out in this order, and then the film was dried at 80° C.

<Preparation of Polarizer>

A 120 μm thick polyvinyl alcohol film of a long-length roll was immersed in 100 parts by mass of an aqueous solution incorporating 1 part by mass of iodine and 4 parts by mass of boric acid and was stretched at 50° C. by a factor of 6 in the film transport direction, whereby a polarizer was prepared.

A KC4FR film produced by KONICA MINOLTA OPTO, Inc. saponified in the same manner as above on one surface of the above polarizer, and aforementioned alkali-saponified cellulose ester film of the present invention on the other surface of the polarizer were adhered employing a 5% aqueous solution of fully saponified polyvinyl alcohol as an adhesive, so that the transmission axis of the polarizer and the in-plane slow axis of each film were laid parallel. The products were dried to obtain polarizing plates 13 and 26-33.

(Evaluation of Reworking Property)

The prepared polarizing plate was cut into a square of 20×20 cm, followed by adhesion onto a glass substrate employing an acrylic adhesive. Subsequently, the adhered polarizing plate was peeled from the glass from the corner via a force of 5 N. The above operation was carried out for 100 polarizing plates of one type, and the number of polarizing plates which were not completely peeled off due to cracking, and the reworking property was ranked based on the following criteria.

○: 0-5 plates
  ○Δ: 6-10 plates
  Δ: 11-15 plates
  x: at least 16 plates

The reworking property of C or higher results in no practical problems, while it is preferably at the A and B levels, but is more preferably at the A level.

TABLE 3

| Cellulose ester film No. | Total acyl group substitution degree | Propionyl group substitution degree | Reworking property | Remarks |
| --- | --- | --- | --- | --- |
| 26 | 2.5 | 1.5 | ○ | Inventive |
| 27 | 2.9 | 1.0 | ○ | Inventive |
| 13 | 2.7 | 1.3 | ○ | Inventive |
| 28 | 2.5 | 1.2 | ○ | Inventive |
| 29 | 2.8 | 1.2 | ○ | Inventive |
| 30 | 2.3 | 1.0 | ○Δ | Inventive |
| 31 | 2.95 | 1.5 | ○Δ | Inventive |
| 32 | 2.7 | 0.7 | ○Δ | Inventive |
| 33 | 2.7 | 1.7 | ○Δ | Inventive |

It is clear that the inventive cellulose ester films 13 and 26-33 each exhibit an excellent reworking property.

What is claimed is:

1. A method for producing a cellulose ester film by a melt cast method comprising the steps of:
    heating to melt a composition without a solvent comprising a cellulose ester and an additive to a temperature at which the composition exhibits fluidity, whereby a melt of the composition is obtained;
    casting the melt followed by cooling;
    stretching the cellulose ester film at a stretching rate of 1,000%/min-30,000%/min in a film transport direction and/or at a stretching rate of 400%/min-1,500%/min in the lateral direction,
    provided that the stretching rate is represented by following Equation (1);
    Equation (1): stretching rate (%/min)=((a dimension after stretching)/(a dimension before stretching)−1)×100 (%)/a time needed for stretching (min), and wherein the cellulose ester film comprising a phosphorus-containing compound having a phosphonite structure or a phosphite structure.

2. The film producing method of claim 1, wherein the cellulose ester film is stretched at 50%-200% in at least one of the film transport direction and the lateral direction.

3. The film producing method of claim 1, wherein the cellulose ester film satisfies a condition of:
    0.95<(a content of a plasticizer on A surface)/(a content of a plasticizer on B surface)<1.05,
    provided that A surface represents one surface of the cellulose ester film and B surface represents the other surface of the cellulose ester film; and
    a sound velocity along at least one of a film transport direction and the lateral direction is 2.0-2.7 km/s at 23° C. under 55% RH.

4. The film producing method of claim 1, wherein
    a total acyl substitution degree of the cellulose ester film is 2.5-2.9; and
    a propionyl substitution degree of the cellulose ester film is 1.0-1.5.

5. A polarizing plate comprising the cellulose ester film of claim 1.

6. A liquid crystal, display comprising the polarizing plate of claim 5.

* * * * *